(12) United States Patent
Takeuchi et al.

(10) Patent No.: US 7,071,628 B2
(45) Date of Patent: Jul. 4, 2006

(54) ELECTRONIC PULSE GENERATION DEVICE

(75) Inventors: Yukihisa Takeuchi, Nishikamo-gun (JP); Tsutomu Nanataki, Toyoake (JP); Iwao Ohwada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/719,521

(22) Filed: Nov. 21, 2003

(65) Prior Publication Data

US 2004/0135438 A1 Jul. 15, 2004

(30) Foreign Application Priority Data

| Nov. 29, 2002 | (JP) | ............................. 2002-348900 |
| Nov. 29, 2002 | (JP) | ............................. 2002-348908 |
| Nov. 29, 2002 | (JP) | ............................. 2002-348916 |
| May 30, 2003 | (JP) | ............................. 2003-155773 |

(51) Int. Cl.
G09G 3/10 (2006.01)

(52) U.S. Cl. ..................... 315/169.1; 313/306; 313/310

(58) Field of Classification Search ............. 315/169.1, 315/169.3; 313/495–496, 309–310, 306
See application file for complete search history.

(56) References Cited

U.S. PATENT DOCUMENTS

| 5,280,221 | A | 1/1994 | Okamoto et al. ......... 315/169.1 |
| 5,382,867 | A | 1/1995 | Yuji et al. ................... 313/309 |
| 5,453,661 | A | 9/1995 | Auciello et al. ............... 315/1 |
| 5,508,590 | A | 4/1996 | Sampayan et al. ....... 315/169.1 |
| 5,656,887 | A | 8/1997 | Voshell et al. ............. 313/496 |
| 5,657,054 | A | 8/1997 | Files et al. ................... 345/177 |
| 5,666,019 | A | 9/1997 | Potter ......................... 813/306 |
| 5,689,121 | A | 11/1997 | Kitagawa et al. ........... 257/139 |
| 5,726,524 | A | 3/1998 | Debe .......................... 313/309 |
| 5,729,094 | A | 3/1998 | Geis et al. ................ 315/169.1 |
| 5,747,926 | A | 5/1998 | Nakamoto et al. .......... 313/495 |
| 5,874,802 | A | 2/1999 | Choi et al. .................. 313/495 |
| 5,877,594 | A | 3/1999 | Miyano et al. .......... 315/169.1 |
| 5,986,389 | A | 11/1999 | Tsukamoto .................. 313/310 |
| 5,990,605 | A | 11/1999 | Yoshikawa et al. ......... 313/310 |
| 6,025,819 | A | * 2/2000 | Xie et al. .................. 345/75.1 |
| 6,040,973 | A | 3/2000 | Okamoto et al. ........... 361/235 |
| 6,153,978 | A | 11/2000 | Okamoto .................. 315/169.3 |
| 6,157,145 | A | 12/2000 | Vollkommer et al. ....... 315/339 |
| 6,184,610 | B1 * | 2/2001 | Shibata et al. .............. 313/309 |
| 6,184,612 | B1 | 2/2001 | Negishi et al. ............. 313/310 |

(Continued)

FOREIGN PATENT DOCUMENTS

DE 3833604 4/1990

(Continued)

OTHER PUBLICATIONS

U.S. Appl. No. 10/951,509, filed Sep. 28, 2004, Takeuchi et al.

(Continued)

*Primary Examiner*—Thuy Vinh Tran
(74) *Attorney, Agent, or Firm*—Burr & Brown

(57) ABSTRACT

An electronic pulse generation device has an emitter section having a plate shape, a cathode electrode formed on a front surface of the emitter section, an anode electrode formed on a back surface of the emitter section, and a pulse generation source which applies a drive voltage between the cathode electrode and the anode electrode through a resistor. The anode electrode is connected to GND through another resistor. A collector electrode is provided above the cathode electrode, and the collector electrode is coated with a phosphor layer. A bias voltage is applied to the collector electrode through another resistor.

10 Claims, 29 Drawing Sheets

U.S. PATENT DOCUMENTS

| | | | |
|---|---|---|---|
| 6,198,225 B1* | 3/2001 | Kano et al. ............... | 315/169.3 |
| 6,274,881 B1 | 8/2001 | Akiyama et al. ............. | 257/10 |
| 6,285,123 B1 | 9/2001 | Yamada et al. ............. | 313/495 |
| 6,306,001 B1 | 10/2001 | Hiroki ........................... | 445/6 |
| 6,313,815 B1 | 11/2001 | Takeda et al. ............. | 345/75.2 |
| 6,359,383 B1 | 3/2002 | Chuang et al. ............. | 313/496 |
| 6,420,822 B1 | 7/2002 | Symons ................... | 313/426 R |
| 6,452,328 B1 | 9/2002 | Saito et al. ................. | 313/495 |
| 6,469,452 B1 | 10/2002 | Seo et al. ................. | 315/169.4 |
| 6,479,924 B1 | 11/2002 | Yoo ........................... | 313/310 |
| 6,514,891 B1 | 2/2003 | Lee ............................ | 501/32 |
| 6,580,108 B1 | 6/2003 | Utsumi et al. ............. | 257/288 |
| 6,827,619 B1 | 12/2004 | Oda et al. ........................ | 445/6 |
| 2002/0060516 A1 | 5/2002 | Kawate et al. ............. | 313/495 |
| 2002/0153827 A1 | 10/2002 | Takeuchi et al. ............ | 313/495 |

FOREIGN PATENT DOCUMENTS

| | | |
|---|---|---|
| DE | 10057072 | 5/2001 |
| EP | 0 353 632 | 2/1990 |
| EP | 428853 | 5/1991 |
| EP | 0 953 958 A2 | 11/1999 |
| FR | 2639151 | 5/1990 |
| FR | 2675306 | 10/1992 |
| FR | 2789221 | 8/2000 |
| FR | 2789223 | 8/2000 |
| JP | 44-26125 | 11/1969 |
| JP | 46-20944 | 6/1971 |
| JP | 59-208587 | 11/1984 |
| JP | 63-150837 A | 6/1988 |
| JP | 1-311533 A | 12/1989 |
| JP | 05-325777 | 12/1993 |
| JP | 7-147131 A | 6/1995 |
| JP | 08-111166 | 4/1996 |
| JP | 08-264105 | 10/1996 |
| JP | 09-090882 A | 4/1997 |
| JP | 10-27539 A | 1/1998 |
| JP | 11-185600 | 7/1999 |
| JP | 11-288249 A | 10/1999 |
| JP | 2000-268709 | 9/2000 |
| JP | 2000-285801 A | 10/2000 |
| JP | 2000-310970 A | 11/2000 |
| JP | 2001-015840 | 1/2001 |
| JP | 3160213 B2 | 2/2001 |
| JP | 3168353 | 3/2001 |
| JP | 3214256 | 7/2001 |
| JP | 2002-124178 | 4/2002 |
| WO | 02/052600 A1 | 7/2002 |

OTHER PUBLICATIONS

U.S. Appl. No. 10/950,976, filed Sep. 27, 2004, Takeuchi et al.

U.S. Appl. No. 10/952,524, filed Sep. 28, 2004, Takeuchi et al.

U.S. Appl. No. 10/951,832, filed Sep. 28, 2004, Takeuchi et al.

Kanemaru, Seigou, "Featuring: All About Flat Displays 2000, Leading Technological Trend of FEDs," Electronic Engineering, Nikkan Kogyo Shimbun, Ltd., Jul. 2000, pp. 38-41 (with partial translation).

U.S. Appl. No. 10/919,747, filed Aug. 17, 2001, Takeuchi et al.

U.S. Appl. No. 10/901,932, filed Jul. 29, 2004, Takeuchi et al.

U.S. Appl. No. 10/919,678, filed Aug. 17, 2004, Takeuchi et al.

U.S. Appl. No. 10/808,258, filed Mar. 24, 2004, Takeuchi et al.

G. Benedek et al., "Electron Emission From Ferroelectric/Antiferroelectric Cathodes Excited by Short High-Voltage Pulses", Journal Applied Physics, vol. 81, No. 3, Feb. 1, 1997, pp. 1396-1403.

Gundel, H. et al., "Low Pressure Hollow Cathode Switch Triggered by a Pulsed Electron Beam Emitted From Ferroelectrics", Applied Physics Letter, American Institute of Physics, New York, US vol. 54, No. 21, May 22, 1989, pp. 2071-2073.

Gundel, H. et al., "Time-Dependent Electron Emission From Ferroelectrics by External Pulsed Electric Fields", Journal of Applied Physics, American Institute of Physics, New York, US vol. 69, No. 2, Jan. 15, 1991, pp. 975-982.

U.S. Appl. No. 10/730,754, filed Dec. 8, 2003, Takeuchi et al.

U.S. Appl. No. 10/731,901, filed Dec. 9, 2003, Takeuchi et al.

U.S. Appl. No. 10/374,955, filed Feb. 25, 2003, Takeuchi et al.

U.S. Appl. No. 10/459,415, filed Jun. 11, 2003, Takeuchi et al.

U.S. Appl. No. 10/459,110, filed Jun. 11, 2003, Takeuchi et al.

U.S. Appl. No. 10/459,416, filed Jun. 11, 2003, Takeuchi et al.

U.S. Appl. No. 10/459,386, filed Jun. 11, 2003, Takeuchi et al.

U.S. Appl. No. 10/647,794, filed Aug. 25, 2003, Takeuchi et al.

U.S. Appl. No. 10/673,384, filed Sep. 26, 2003, Takeuchi et al.

U.S. Appl. No. 10/671,763, filed Sep. 26, 2003, Takeuchi et al.

U.S. Appl. No. 10/699,186, filed Oct. 31, 2003, Takeuchi et al.

U.S. Appl. No. 10/719,596, filed Nov. 21, 2003, Takeuchi et al.

"Pulsed Electron Source Using a Ferroelectric Cathode," Tokyo Institute of Technology, vol. 68, No. 5, Jan. 7, 1999, pp. 546-550.

Puchkarev, Victor F. and Mesyats, Gennady A., "On the Mechanism of Emission from the Ferroelectric Ceramic Cathode," Journal of Applied Physics, vol. 78, No. 9, Nov. 1, 1995, pp. 5633-5637.

Riege, H., "Electron Emission from Ferroelectrics—a Review," Nucl. Instr. and Meth. A340, 1994, pp. 80-89.

Masatoshi Miyake et al., "Electron Emission from Ferroelectric Cathodes Excited by Pulsed Voltage," Tokyo Institute of Technology, vol. 119, No. 5, 1999 pp. 622-627.

* cited by examiner

ELECTRONIC PULSE GENERATION DEVICE

This application claims the benefit of Japanese Application 2002-348900, filed Nov. 29, 2002, Japanese Application 2002-348908, filed Nov. 29, 2002, Japanese Application 2002-348916, filed Nov. 29, 2002, and Japanese Application 2003-155773, filed May 30, 2003, the entireties of which are incorporated herein by reference.

BACKGROUND OF THE INVENTION

1. Field of the Invention

The present invention relates to an electronic pulse generation device having a first electrode and a second electrode formed on an emitter element.

2. Description of the Related Art

In recent years, electronic pulse generation devices have electron emitters which have a cathode electrode and an anode electrode as a basic device. The electronic pulse generation devices have been used in various applications such as field emission displays (FEDs) and backlight units. When the electronic pulse generation devices are applied as the FEDS, a plurality of electron emitters are arranged in a two-dimensional array, and a plurality of phosphors are positioned at predetermined intervals in association with the respective electron emitters.

The conventional examples of the electronic pulse generation devices are disclosed in Japanese laid-open patent publication No. 1-311533, Japanese laid-open patent publication No. 7-147131, Japanese laid-open patent publication No. 2000-285801, Japanese patent publication No. 46-20944, and Japanese patent publication No. 44-26125, for example. All of these disclosed devices are disadvantageous in that since no dielectric material is employed in the emitter element, a forming process or a micromachining process is required between facing electrodes, a high voltage needs to be applied between the electrodes to emit electrons, and a panel fabrication process is complex and entails a high panel fabrication cost.

It has been considered to make an emitter element of a dielectric material. Various theories about the emission of electrons from a dielectric material have been presented in the documents: Yasuoka and Ishii, "Pulsed electron source using a ferroelectric cathode", J. Appl. Phys., Vol. 68, No. 5, p. 546–550 (1999), V. F. Puchkarev, G. A. Mesyats, "On the mechanism of emission from the ferroelectric ceramic cathode", J. Appl. Phys., Vol. 78, No. 9, 1 Nov., 1995, p. 5633–5637, and H. Riege, "Electron emission from ferroelectrics—a review", Nucl. Instr. and Meth. A340, p. 80–89 (1994).

In the conventional example of the electronic pulse generation device, electrons trapped on the surface of the dielectric material, at the interface between the dielectric material and the upper electrode, and in the dielectric material by the defect level are released (emitted) when polarization reversal occurs in the dielectric material. The number of the electrons emitted by the polarization reversal does not change substantially depending on the voltage level of the applied voltage pulse.

However, the electron emission is not performed stably, and the number of emitted electrons is merely tens of thousands. Therefore, the conventional example of the electronic pulse generation devices are not suitable for practical use. Advantages of an electronic pulse generation device having an emitter element made of a dielectric material have not been achieved.

SUMMARY OF THE INVENTION

The present invention has been made to solve the above problems, and an object of which is to provide an electronic pulse generation device made of a dielectric material, and suitable for practical applications in which electrons are emitted stably, and the number of the emitted electrons is controlled easily.

The electronic pulse generation device according to the present invention comprises an emitter element made of a dielectric material, first and second electrodes in contact with the emitter element, and means for applying alternating pulse between the first and second electrodes to change or reverse polarization of the emitter element. The emitting element is made of an piezoelectric material, an anti-ferroelectric material, or an electrostrictive material.

Operation of the electronic pulse generation device including the emitting element made of a dielectric material according to the present invention will be described. Firstly, an alternating pulse is applied between the first electrode and the second electrode for causing the first electrode to have a potential lower than a potential of the second electrode to reverse or change polarization of at least a portion of the emitter element. The polarization reversal or the polarization change causes emission of electrons in the vicinity of the first electrode. The polarization reversal or the polarization change generates a locally concentrated electric field on the first electrode and the positive poles of dipole moments in the vicinity the first electrode, emitting primary electrons from the first electrode. The primary, electrons emitted from the first electrode impinge upon the emitter element, causing the emitter element to emit secondary electrons.

When the first electrode, the emitter element, and a vacuum atmosphere define a triple point, primary electrons are emitted from a portion of the first electrode in the vicinity of the triple point. The emitted primary electrons impinge upon the emitter element to induce emission of secondary electrons from the emitter element. If the first electrode is very thin, having a thickness of 10 nm or less, electrons are emitted from the interface between the first electrode and the emitter element.

The secondary electrons herein include electrons emitted from the solid emitter element under an energy that has been generated by a coulomb collision with primary electrons, Auger electrons, and primary electrons which are scattered in the vicinity of the surface of the emitter element (reflected electrons).

Since the electrons are emitted according to the principle as described above, the electron emission is stably performed, and the number of emitted electrons would reach 2 billion or more. Thus, the electronic pulse generation device is advantageously used in the practical applications. The number of emitted electrons is increased substantially proportional to the voltage between the first electrode and the second electrode. Thus, the number of the emitted electrons can be controlled easily.

When the electronic pulse generation device is used as a pixel of a display, a third electrode is provided above the emitter element at a position facing the first electrode. The third electrode is coated with a phosphor layer. Some of the emitted electrons are guided to the third electrode to excite the phosphor layer to emit fluorescent light from the phosphor layer to the outside.

The third electrode may be provided such that the third electrode faces the emitter element, and a vacuum space is present between the emitter element and the third electrode. Means for applying positive direct bias voltage to the third electrode may be provided so that electrons are emitted from the emitter element toward the third electrode intermittently.

In the means for applying alternating pulse, the polarization of the emitter element in one direction may be performed by applying a first voltage between the first electrode and the second electrode for causing the first electrode to have a potential higher than a potential of the second electrode in a first period, and the polarization reversal or polarization change of the emitter element for emitting electrons may be performed by applying a second voltage between the first electrode and the second electrode for causing the first electrode to have a potential lower than a potential of the second electrode in a second period.

In the present invention, the first electrode and the second electrode may be formed in contact with the emitter element; and a slit may be formed between the first electrode and the second electrode.

In this case, polarization reversal or polarization change may occur in an electric field E applied to the emitter element represented by E=Vak/d, where d is a width of the slit, and Vak is a voltage between the first electrode and the second electrode.

In the present invention, the first electrode may be formed on a first surface of the emitter element, and the second electrode may be formed on a second surface of the emitter element. In this case, polarization reversal or polarization change may occur in an electric field E applied to the emitter element represented by E=Vak/h, where h is a thickness of the emitter element between the first electrode and the second electrode, and Vak is a voltage between the first electrode and the second electrode.

Preferably, the voltage Vak between the first electrode and the second electrode is less than a dielectric breakdown voltage of the emitter element.

The above and other objects, features, and advantages of the present invention will become more apparent from the following description of preferred embodiments when taken in conjunction with the accompanying drawings.

DESCRIPTION OF THE PREFERRED EMBODIMENTS

Electronic pulse generation devices according to embodiments of the present invention will be described below with reference to FIGS. 1 through 29.

The electronic pulse generation devices according to embodiments of the present invention can be used in displays, electron beam irradiation apparatus, light sources, alternatives to LEDs, and apparatus for manufacturing electronic parts.

Electron beams in electron beam irradiation apparatus have a high energy and a good absorption capability in comparison with ultraviolet rays in ultraviolet ray irradiation apparatus that are presently in widespread use.

The electronic pulse generation devices are used to solidify insulating films in superposing wafers for semiconductor devices, harden printing inks without irregularities for drying prints, and sterilize medical devices while being kept in packages.

The electronic pulse generation devices are also used as high-luminance, high-efficiency light sources such as a projector having a high pressure mercury lamp. The electronic pulse generation device according to the present embodiment is suitably used as a light source. The light source using the electronic pulse generation device according to the present embodiment is compact, has a long service life, has a fast response speed for light emission. The electronic pulse generation device does not use any mercury, and the electronic pulse generation device is environmentally friendly.

The electronic pulse generation devices are also used as alternatives to LEDs in indoor lights, automobile lamps, surface light sources for traffic signal devices, chip light sources, and backlight units for traffic signal devices, small-size liquid-crystal display devices for cellular phones.

The electronic pulse generation devices are also used in apparatus for manufacturing electronic parts, including electron beam sources for film growing apparatus such as electron beam evaporation apparatus, electron sources for generating a plasma (to activate a gas or the like) in plasma CVD apparatus, and electron sources for decomposing gases. The electronic pulse generation devices are also used as vacuum micro devices such as high speed switching devices operated at a frequency on the order of Tera-Hz, and large current outputting devices. Further, the electronic pulse generation devices are used suitably as parts of printers, such as light emitting devices for emitting light to a photosensitive drum, and electron sources for charging a dielectric material.

The electronic pulse generation devices are also used as electronic circuit devices including digital devices such as switches, relays, and diodes, and analog devices such as operational amplifiers. The electronic pulse generation devices are used for realizing a large current output, and a high amplification ratio.

Figure 1:
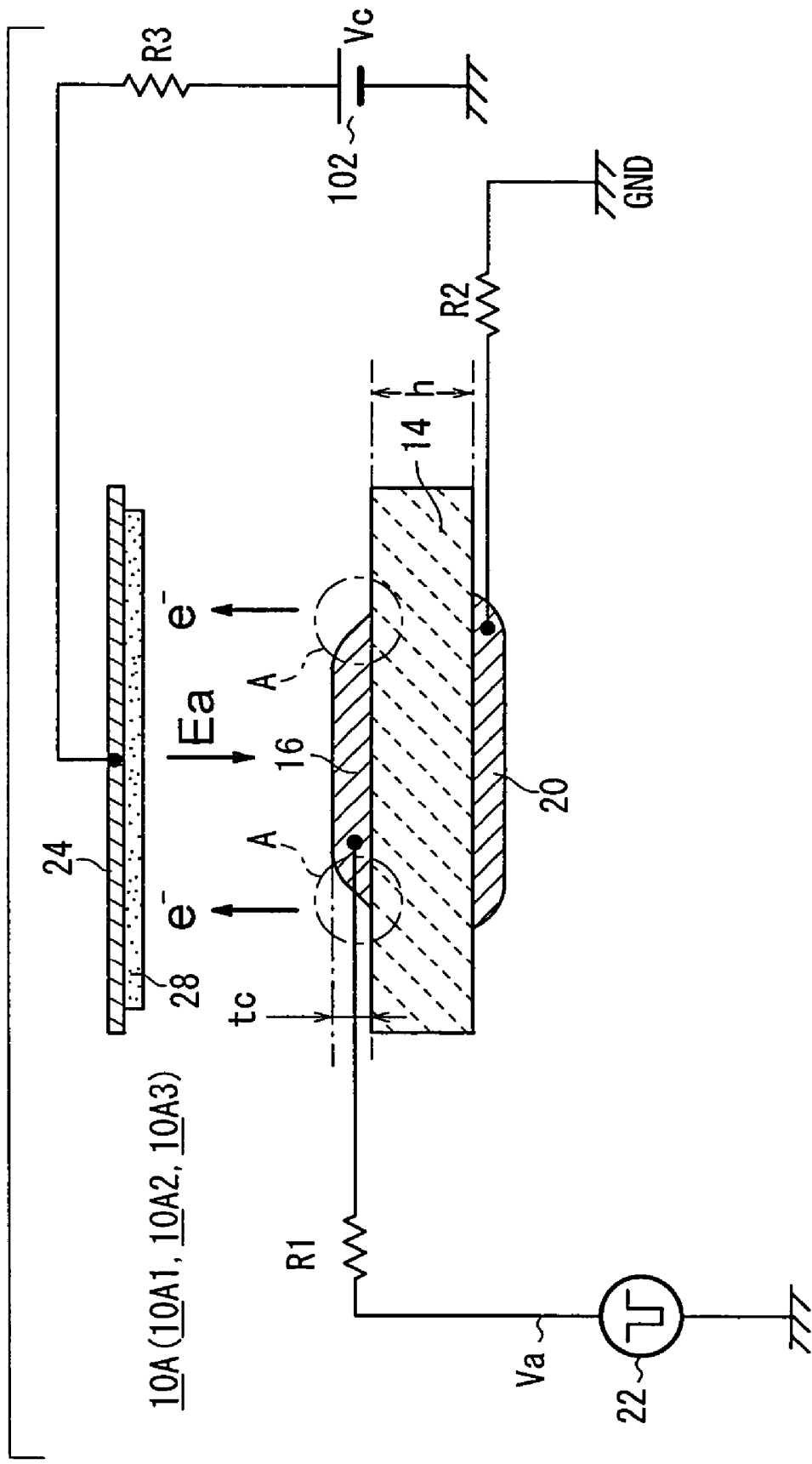
FIG. 1 is a view showing an electronic pulse generation device according to a first embodiment of the present invention.

As shown in FIG. 1, an electronic pulse generation device 10A according to a first embodiment of the present invention has an emitter section (emitter element) 14 having a plate shape, a first electrode (a cathode electrode) 16 formed on a front surface of the emitter section 14, a second electrode (an anode electrode) 20 formed on a back surface of the emitter section 14, and a pulse generation source (means for applying alternating pulse) 22 which applies a drive voltage Va between the cathode electrode 16 and the anode electrode 20 through a resistor R1.

Figure 2:
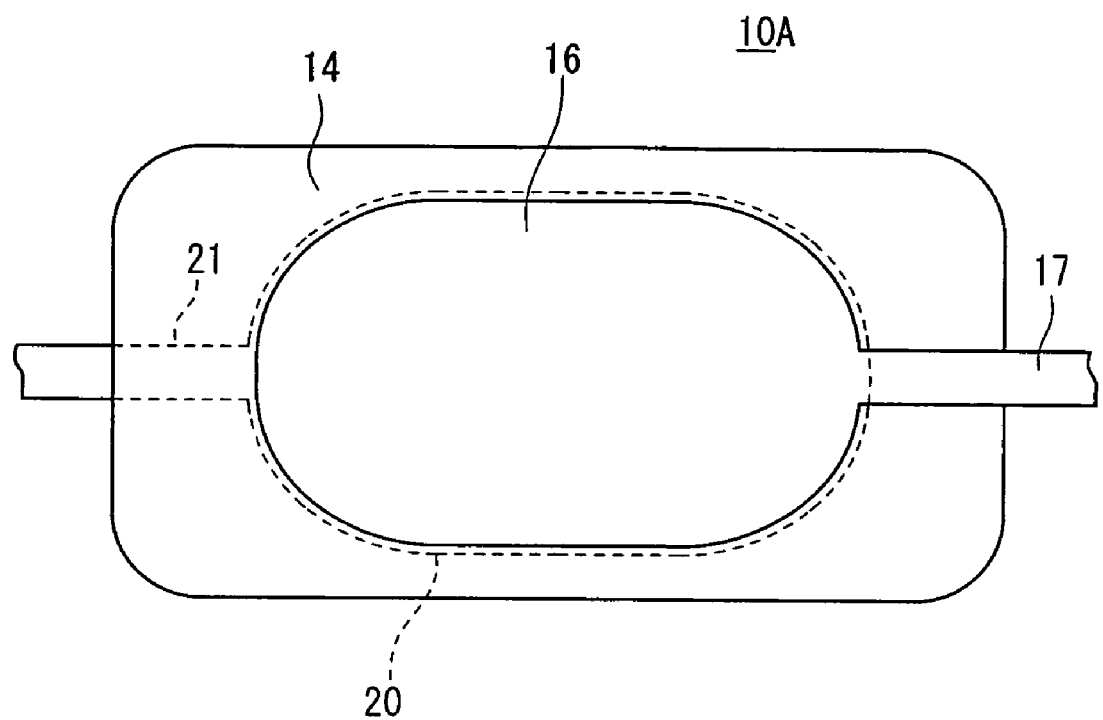
FIG. 2 is a plan view showing electrodes of the electronic pulse generation device according to the first embodiment of the present invention.

In an example shown in FIG. 1, the anode electrode 20 is connected to GND (ground) and hence set to a zero potential. However, the anode electrode 20 may be set to a potential other than the zero potential. As shown in FIG. 2, the drive voltage Va is applied between the cathode electrode 16 and the anode electrode 20 through a lead electrode 17 extending from the cathode electrode 16 and a lead electrode 21 extending from the anode electrode 20, for example.

For using the electronic pulse generation device 10A as a pixel of a display, a collector electrode 24 is positioned above the cathode electrode 16, and the collector electrode 24 is coated with a phosphor layer 28. The collector electrode 24 is connected to a bias voltage source 102 (bias voltage Vc) through a resistor R3.

The electronic pulse generation device 10A according to the first embodiment of the present invention is placed in a vacuum space. As shown in FIG. 1, the electronic pulse generation device 10A has electric field concentration point A. The point A can be defined as a triple point where the cathode electrode 16, the emitter section 14, and the vacuum are present at one point.

The vacuum level in the atmosphere is preferably in the range from $10^2$ to $10^{-6}$ Pa and more preferably in the range from $10^{-3}$ to $10^{-5}$ Pa.

The range of the vacuum level is determined for the following reason. In a lower vacuum, (1) many gas molecules would be present in the space, and a plasma can easily be generated and, if the plasma were generated excessively, many positive ions would impinge upon the cathode electrode 16 and damage the cathode electrode 16, and (2) emitted electrons would impinge upon gas molecules prior to arrival at the collector electrode 24, failing to sufficiently excite the phosphor layer 28 with electrons that are sufficiently accelerated by the collector potential (Vc).

In a higher vacuum, though electrons are smoothly emitted from the electric field concentration point A, structural body supports and vacuum seals would be large in size, posing difficulty in making a small electronic pulse generation device.

The emitter section 14 is made of a dielectric material. The dielectric material should preferably have a high relative dielectric constant (relative permittivity), e.g., a dielectric constant of 1000 or higher. Dielectric materials of such a nature may be ceramics including barium titanate, lead zirconate, lead magnesium niobate, lead nickel niobate, lead zinc niobate, lead manganese niobate, lead magnesium tantalate, lead nickel tantalate, lead antimony stannate, lead titanate, lead magnesium tungstenate, lead cobalt niobate, etc. or a material whose principal component contains 50 weight % or more of the above compounds, or such ceramics to which there is added an oxide of lanthanum, calcium, strontium, molybdenum, tungsten, barium, niobium, zinc, nickel, manganese, or the like, or a combination of these materials, or any of other compounds.

For example, a two-component material nPMN-mPT (n, m represent molar ratios) of lead magnesium niobate (PMN) and lead titanate (PT) has its Curie point lowered for a larger relative dielectric constant at room temperature if the molar ratio of PMN is increased.

Particularly, a dielectric material where n=0.85–1.0 and m=1.0−n is preferable because its relative dielectric constant is 3000 or higher. For example, a dielectric material where n=0.91 and m=0.09 has a relative dielectric constant of 15000 at room temperature, and a dielectric material where n=0.95 and m=0.05 has a relative dielectric constant of 20000 at room temperature.

For increasing the relative dielectric constant of a three-component dielectric material of lead magnesium niobate (PMN), lead titanate (PT), and lead zirconate (PZ), it is preferable to achieve a composition close to a morphotropic phase boundary (MPB) between a tetragonal system and a quasi-cubic system or a tetragonal system and a rhombohedral system, as well as to increase the molar ratio of PMN. For example, a dielectric material where PMN:PT:PZ=0.375:0.375:0.25 has a relative dielectric constant of 5500, and a dielectric material where PMN:PT:PZ=0.5:0.375:0.125 has a relative dielectric constant of 4500, which is particularly preferable. Furthermore, it is preferable to increase the dielectric constant by introducing a metal such as platinum into these dielectric materials within a range to keep them insulative. For example, a dielectric material may be mixed with 20 weight % of platinum.

As described above, the emitter section 14 may be formed of a piezoelectric/electrostrictive layer or an anti-ferroelectric layer. If the emitter section 14 is a piezoelectric/electrostrictive layer, then it may be made of ceramics such as lead zirconate, lead magnesium niobate, lead nickel niobate, lead zinc niobate, lead manganese niobate, lead magnesium tantalate, lead nickel tantalate, lead antimony stannate, lead titanate, barium titanate, lead magnesium tungstenate, lead cobalt niobate, or the like, or a combination of any of these materials.

The emitter section 14 may be made of chief components including 50 weight % or more of any of the above compounds. Of the above ceramics, the ceramics including lead zirconate is most frequently used as a constituent of the piezoelectric/electrostrictive layer of the emitter section 14.

If the piezoelectric/electrostrictive layer is made of ceramics, then oxides of lanthanum, calcium, strontium, molybdenum, tungsten, barium, niobium, zinc, nickel, manganese, or the like, or a combination of these materials, or any of other compounds may be added to the ceramics.

For example, the piezoelectric/electrostrictive layer should preferably be made of ceramics including as chief components lead magnesium niobate, lead zirconate, and lead titanate, and also including lanthanum and strontium.

The piezoelectric/electrostrictive layer may be dense or porous. If the piezoelectric/electrostrictive layer is porous, then it should preferably have a porosity of 40% or less.

If the emitter section 14 is formed of an anti-ferroelectric layer, then the anti-ferroelectric layer may be made of lead zirconate as a chief component, lead zirconate and lead stannate as chief components, lead zirconate with lanthanum oxide added thereto, or lead zirconate and lead stannate as components with lead zirconate and lead niobate added thereto.

The anti-ferroelectric layer may be porous. If the anti-ferroelectric layer is porous, then it should preferably have a porosity of 30% or less.

Strontium bismuthate tantalate is used suitably for the emitter section 14. The emitter section 14 made of strontium bismuthate tantalate is not damaged by the polarization reversal easily. For preventing damages due to the polarization reversal, lamellar ferroelectric compounds represented by a general formula $(BiO_2)^{2+}(A_{m-1}B_mO_{3m+1})^{2-}$ are used. The ionized metal A includes $Ca^{2+}$, $Sr^{2+}$, $Ba^{2+}$, $Pb^{2+}$, $Bi^{3+}$, $La^{3+}$, and the ionized metal B includes $Ti^{4+}$, $Ta^{5+}$, $Nb^{5+}$.

Piezoelectric/electrostrictive/anti-ferroelectric ceramics is mixed with glass components such as lead borosilicate glass or other compounds having allow melting point such as bismuth oxide to lower the firing temperature.

The emitter section 14 may be made of a material which does not contain any lead, i.e., made of a material having a high melting temperature, or a high evaporation temperature. Thus, the emitter section 14 is not damaged easily when electrons or ions impinge upon the emitter section 14.

The thickness h (see FIG. 1) of the emitter section 14 between the cathode electrode 16 and the anode electrode 20 is determined so that polarization reversal or polarization change occurs in the electric field E represented by E=Vak/h (Vak is a voltage measured between the cathode electrode 16 and the anode electrode 20 when the drive voltage Va outputted from the pulse generation source 22 is applied between the cathode electrode 16 and the anode electrode 20). When the thickness h is small, the polarization reversal or polarization change occurs at a low voltage, and electrons are emitted at the low voltage (e.g., less than 100V).

The cathode electrode 16 is made of materials described below. The cathode electrode 16 should preferably be made of a conductor having a small sputtering yield and a high evaporation temperature in vacuum. For example, materials having a sputtering yield of 2.0 or less at 600 V in Ar$^+$ and an evaporation temperature of 1800 K or higher at an evaporation pressure of $1.3 \times 10^{-3}$ Pa are preferable. Such materials include platinum, molybdenum, tungsten, etc. Further, the cathode electrode 18 is made of a conductor which is resistant to a high-temperature oxidizing atmosphere, e.g., a metal, an alloy, a mixture of insulative ceramics and a metal, or a mixture of insulative ceramics and an alloy. Preferably, the cathode electrode 16 should be composed chiefly of a precious metal having a high melting point, e.g., platinum, iridium, palladium, rhodium, molybdenum, or the like, or an alloy of silver and palladium, silver and platinum, platinum and palladium, or the like, or a cermet of platinum and ceramics. Further preferably, the cathode electrode 16 should be made of platinum only or a material composed chiefly of a platinum-base alloy. The electrode should preferably be made of carbon or a graphite-base material, e.g., diamond thin film, diamond-like carbon, or carbon nanotube. Ceramics to be added to the electrode material should preferably have a proportion ranging from 5 to 30 volume %.

Further, preferably, organic metal pastes which produce a thin film after firing, such as platinum resinate paste are used. Further, for preventing damages due to polarization reversal, oxide electrode is used. The oxide electrode is made of any of ruthenium oxide, iridium oxide, strontium ruthenate, $La_{1-x}Sr_xCoO_3$ (e.g., x=0.3 or 0.5), $La_{1-x}Ca_xMnO_3$, $La_{1-x}Ca_xMn_{1-y}CO_yO_3$ (e.g., x=0.2, y=0.05). Alternatively, the oxide electrode is made by mixing any of these materials with platinum resinate paste, for example.

The cathode electrode 16 may be made of any of the above materials by an ordinary film forming process which may be any of various thick-film forming processes including screen printing, spray coating, dipping, coating, electrophoresis, etc., or any of various thin-film forming processes including sputtering, an ion beam process, vacuum evaporation, ion plating, chemical vapor deposition (CVD), plating, etc. Preferably, the cathode electrode 18 is made by any of the above thick-film forming processes.

Figure 3:
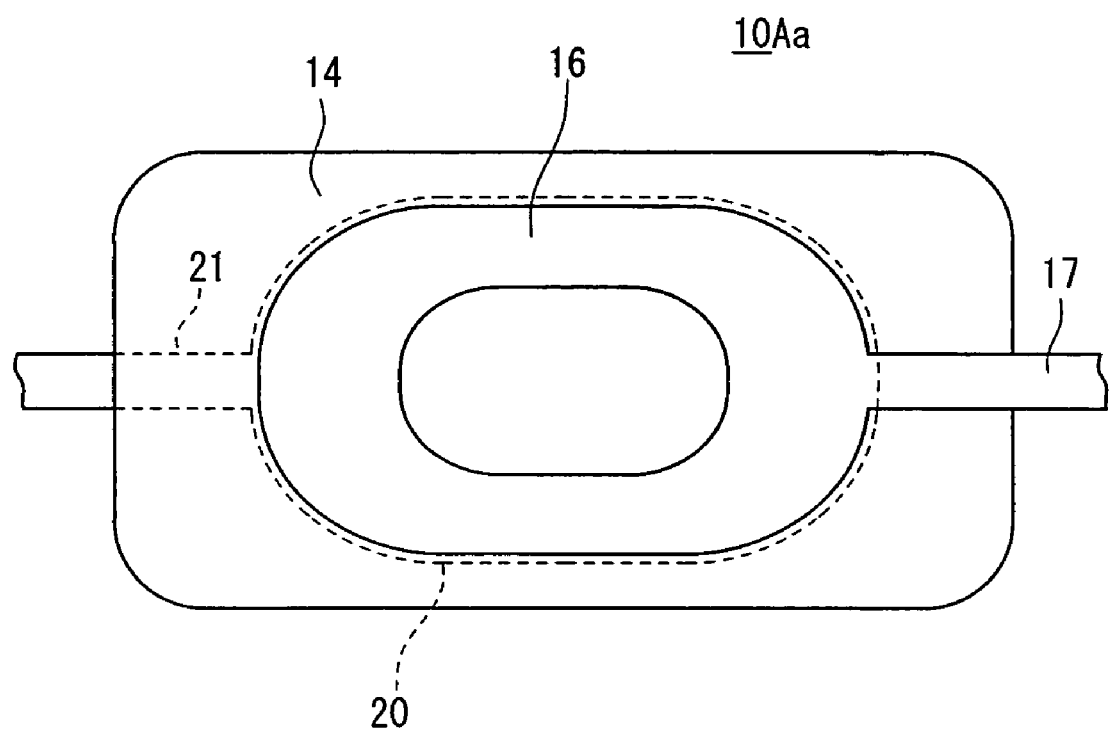
FIG. 3 is a plan view showing electrodes in a first modification of the electronic pulse generation device according to the first embodiment of the present invention.
Figure 4:
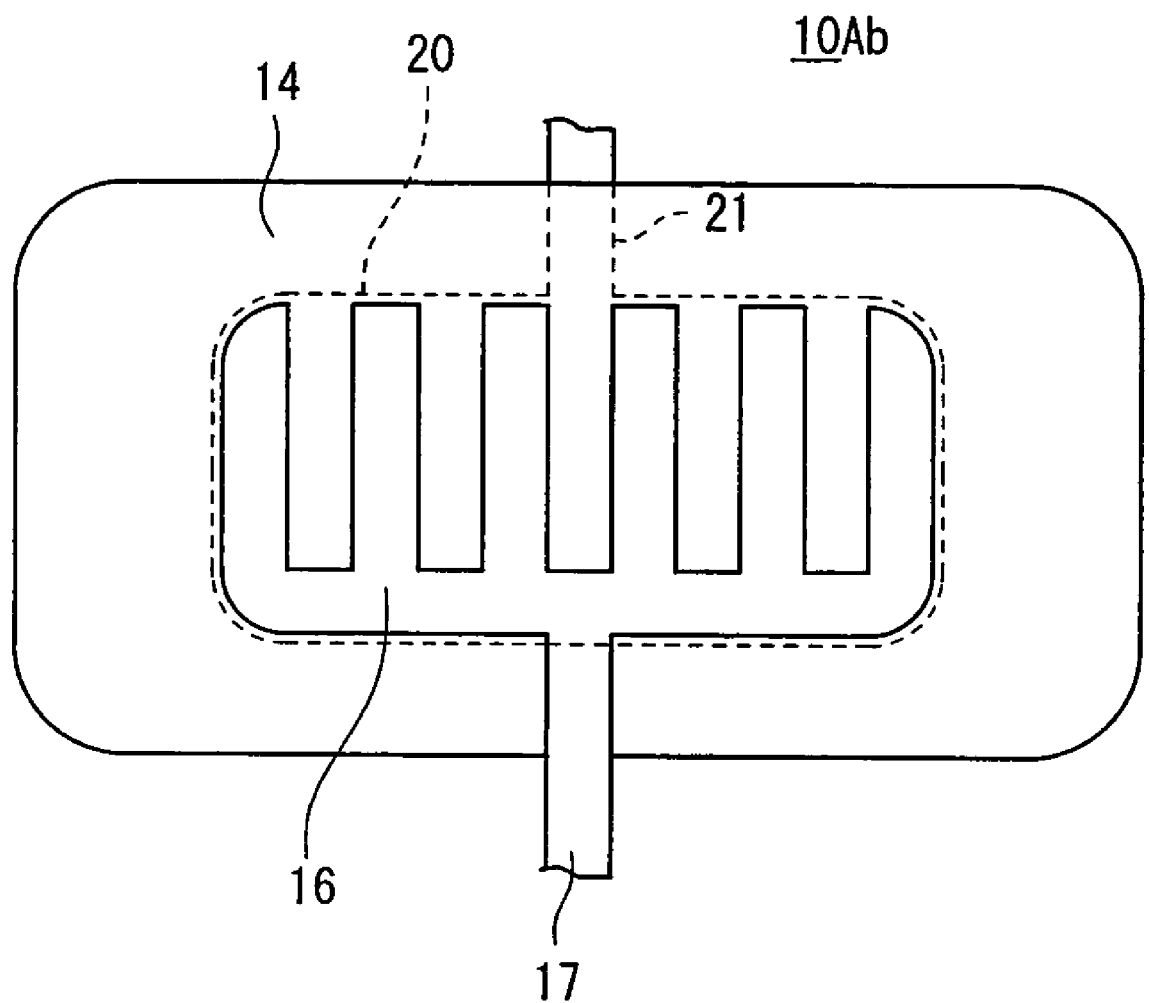
FIG. 4 is a plan view showing electrodes in a second modification of the electronic pulse generation device according to the first embodiment of the present invention.

The cathode electrode 16 may have an oval shape as shown in a plan view of FIG. 2, or a ring shape like an electronic pulse generation device 10Aa of a first modification as shown in a plan view of FIG. 3. Alternatively, the cathode electrode 16 may have a comb teeth shape like an electronic pulse generation device 10Ab of a second modification as shown in FIG. 4.

When the cathode electrode 16 having a ring shape or a comb teeth shape in a plan view is used, the number of triple points (electric field concentration points A) of the cathode electrode 16, the emitter section 14, and the vacuum is increased, and the efficiency of electron emission is improved. Further, electric capacitance is suitably reduced, and electric power consumption is reduced.

Figure 5:
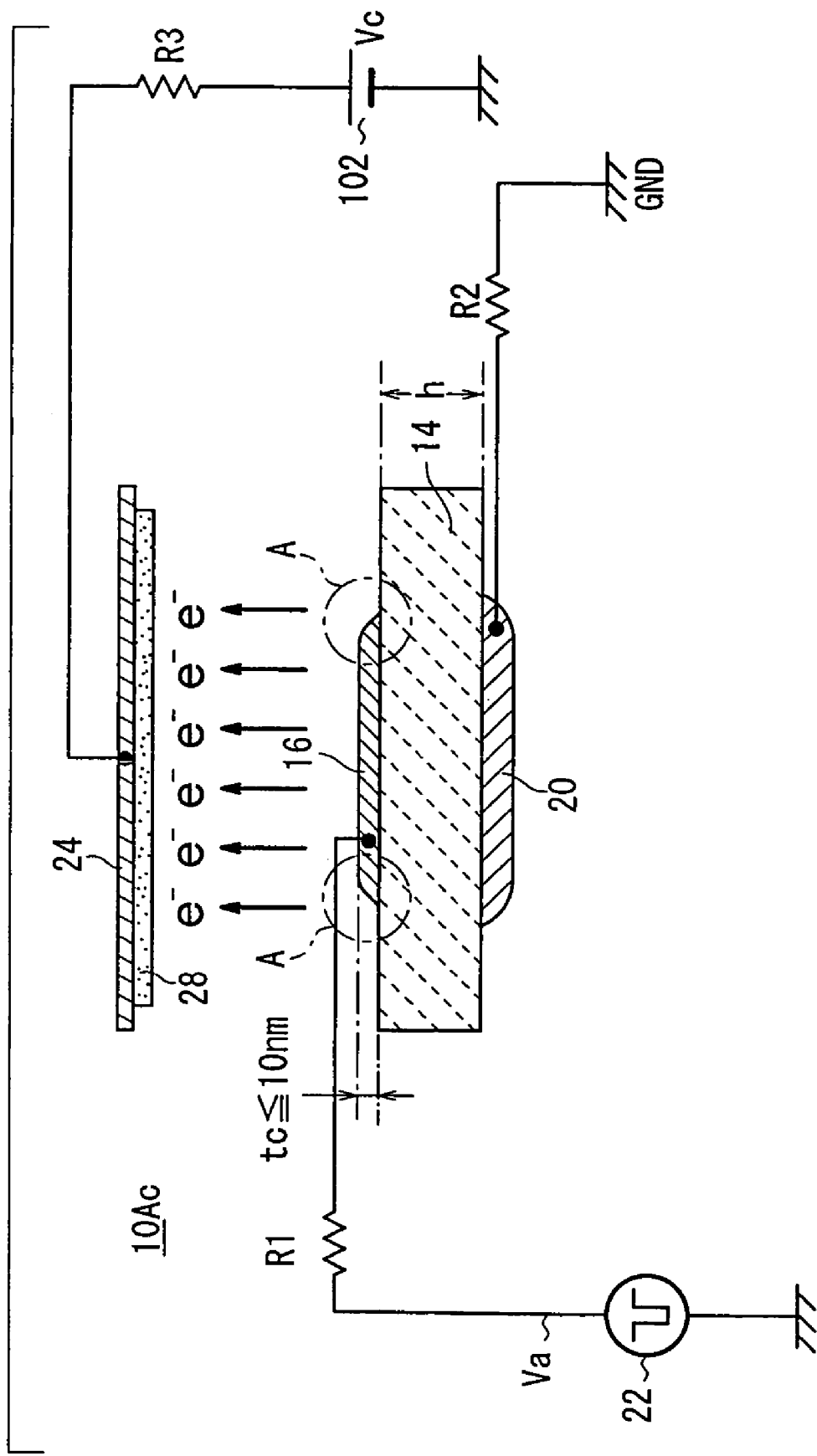
FIG. 5 is a plan view showing electrodes in a third modification of the electronic pulse generation device according to the first embodiment of the present invention.

Preferably, the cathode electrode 16 has a thickness tc (see FIG. 1) of 20 μm or less, or more preferably 5 μm or less. The cathode electrode 16 may have a thickness tc of 100 nm or less. In particular, an electronic pulse generation device 10Ac of a third modification shown in FIG. 5 is very thin, having a thickness tc of 10 nm or less. In this case, electrons are emitted from the interface between the cathode electrode 16 and the emitter section 14, and thus, the efficiency of electron emission is further improved.

The anode electrode 20 is made of the same material by the same process as the cathode electrode 16. Preferably, the anode electrode 20 is made by any of the above thick-film forming processes. Preferably, the anode electrode 20 has a thickness tc of 20 μm or less, or more preferably 5 μm or less.

Each time the emitter section 14, the cathode electrode 16, or the anode electrode 20 is formed, the assembly is heated (sintered) into an integral structure. Depending on the process by which the cathode electrode 16 and the anode electrode 20 are formed, they may not be heated (sintered) so as to be integrally combined together.

The sintering process for integrally combining the emitter section 14, the cathode electrode 16, and the anode electrode 20 may be carried out at a temperature ranging from 500 to 1400° C., preferably from 1000 to 1400° C. For heating the emitter section 14 which is in the form of a film, the emitter section 14 should be sintered together with its evaporation source while their atmosphere is being controlled.

The emitter section 14 may be covered with an appropriate member for preventing the surface thereof from being directly exposed to the sintering atmosphere when the emitter section 14 is sintered.

Figure 6:
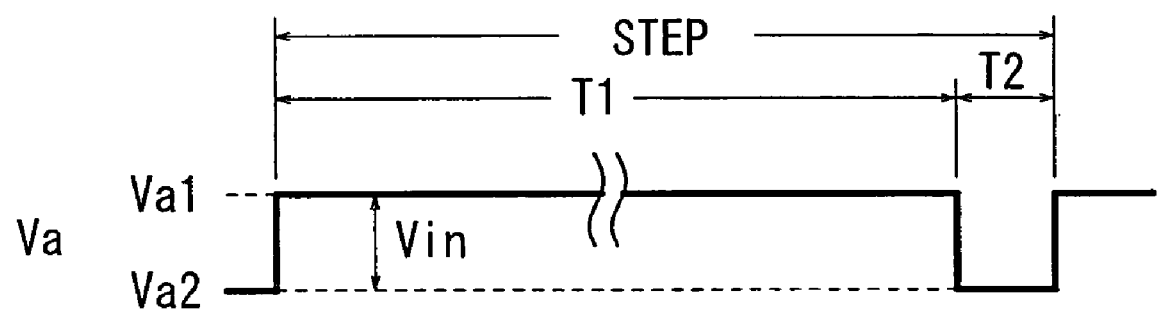
FIG. 6 is a waveform diagram showing a drive voltage outputted from a pulse generation source.

The principles of electron emission of the electronic pulse generation device 10A will be described below with reference to FIGS. 1, and 6 through 11B. As shown in FIG. 6, The drive voltage Va has the waveform of an alternating pulse. The drive voltage Va outputted from the pulse generation source 22 has repeated steps each including a period in which a first voltage Va1 is outputted (preparatory period T1) and a period in which a second voltage Va2 is outputted (electron emission period T2). The first voltage Va1 is such a voltage that the potential of the cathode electrode 16 is higher than the potential of the anode electrode 20, and the second voltage Va2 is such a voltage that the potential of the cathode electrode 16 is lower than the potential of the anode electrode 20. The amplitude Vin of the drive voltage Va can be defined as the difference (=Va1−Va2) between the first voltage Va1 and the second voltage Va2.

Figure 7:
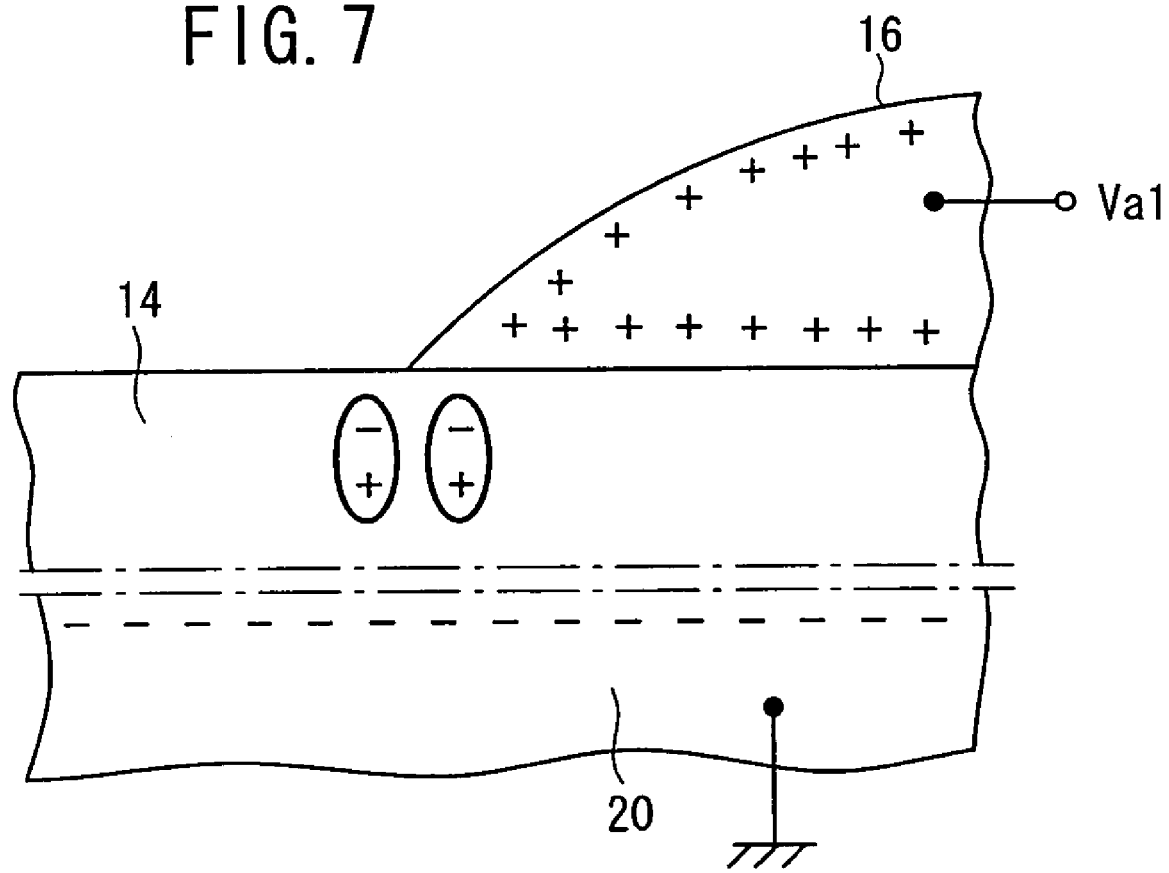
FIG. 7 is a view illustrative of operation when a first voltage is applied between the cathode electrode and the anode electrode.

The preparatory period T1 is a period in which the first voltage Va1 is applied between the cathode electrode 16 and the anode electrode 20 to polarize the emitter section 14, as shown in FIG. 7. The first voltage Va1 may be a DC voltage, as shown in FIG. 6, but may be a single pulse voltage or a succession of pulse voltages. The preparatory period T1 should preferably be longer than the electron emission period T2 for sufficient polarization. For example, the preparatory period T1 should preferably be 100 μsec. or longer. This is because the absolute value of the first voltage Va1 for polarizing the emitter section 14 is smaller than the absolute value of the second voltage Va2 to reduce the power consumption at the time of applying the first voltage Va1, and to prevent the damage of the cathode electrode 16.

Preferably, the voltage levels of the first voltage Va1 and the second voltage Va2 are determined so that the polarization to the positive polarity and the negative polarity can be performed reliably. For example, if the dielectric material of the emitter section 14 has a coercive voltage, preferably, the absolute values of the first voltage Va1 and the second voltage Va2 are the coercive voltage or higher.

Figure 8:
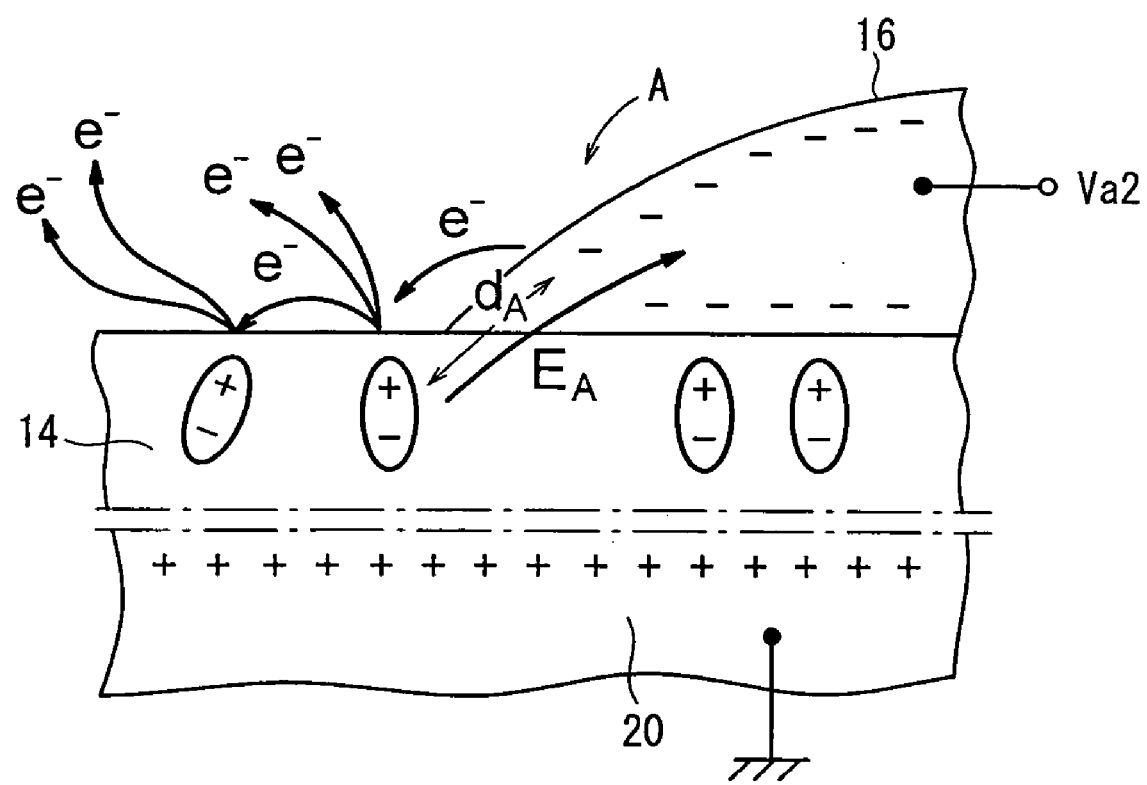
FIG. 8 is a view illustrative of operation when a second voltage is applied between the cathode electrode and the anode electrode.

The electron emission period T2 is a period in which the second voltage Va2 is applied between the cathode electrode 16 and the anode electrode 20. When the second voltage Va2 is applied between the cathode electrode 16 and the anode electrode 20, as shown in FIG. 8, the polarization of at least a part of the emitter section 16 is reversed or changed. Specifically, the polarization reversal or the polarization change occurs at a portion of the emitter section 14 which is underneath the cathode electrode 16, and a portion of the emitter section 14 which is exposed near the cathode electrode 16. The polarization likely to changes at the exposed portion near the cathode electrode 16. Because of the polarization reversal or the polarization change, a locally concentrated electric field is generated on the cathode electrode 16 and the positive poles of dipole moments in the vicinity thereof, emitting primary electrons from the cathode electrode 16. The primary electrons emitted from the cathode electrode 16 impinge upon the emitter section 14, causing the emitter section 14 to emit secondary electrons.

With the electronic pulse generation device 10A of the first embodiment having the triple point A where the cathode electrode 16, the emitter section 14, and the vacuum are present at one point, primary electrons are emitted from the cathode electrode 16 near the triple point A, and the primary electrons thus emitted from the triple point A impinge upon the emitter section 14, causing the emitter section 14 to emit secondary electrons. If the thickness of the cathode electrode 16 is very small (up to 10 nm), then electrons are emitted from the interface between the cathode electrode 16 and the emitter section 14.

Operation by application of the negative voltage Va2 will be described in detail below.

When the second voltage Va2 is applied between the cathode electrode 16 and the anode electrode 20, electrons are emitted from the emitter section 14. Specifically, in the emitter section 14, dipole moments near the cathode electrode 16 are charged when the polarization of the emitter section has been reversed or changed. Thus, emission of the electrons occurs.

A local cathode is formed in the cathode electrode 16 in the vicinity of the interface between the cathode electrode 16 and the emitter section 14, and positive poles of the dipole moments charged in the area of the emitter section 14 near the cathode electrode 16 serve as a local anode which causes the emission of electrons from the cathode electrode 16. Some of the emitted electrons are guided to the collector electrode 24 (see FIG. 1) to excite the phosphor layer 28 to emit fluorescent light from the phosphor layer 28 to the outside. Further, some of the emitted electrons impinge upon the emitter section 14 to cause the emitter section 14 to emit secondary electrons. The secondary electrons are guided to the collector electrode 24 to excite the phosphor layer 28.

Figure 10:
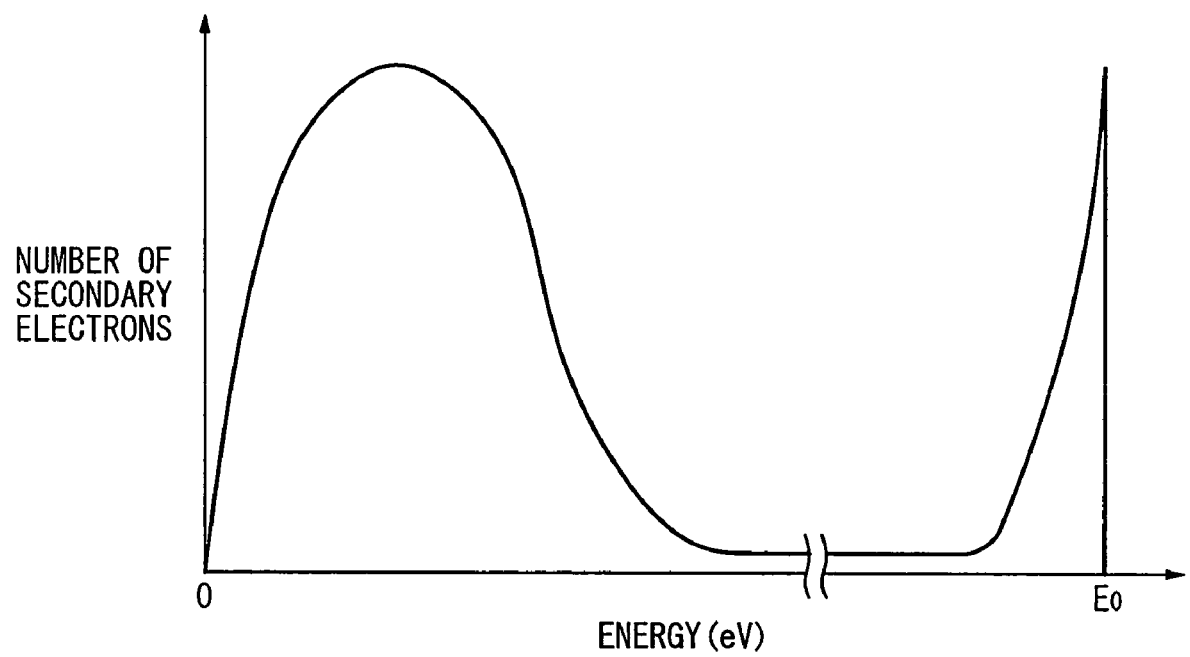
FIG. 10 is a view showing relationship between the energy of the emitted secondary electrons and the number of emitted secondary electrons.

A distribution of emitted secondary electrons will be described below with reference to FIG. 10. As shown in FIG. 10, most of the secondary electrons have an energy level near zero. When the secondary electrons are emitted from the surface of the emitter section 14 into the vacuum, they move according to only an ambient electric field distribution. Specifically, the secondary electrons are accelerated from an initial speed of about 0 (m/sec) according to the ambient electric field distribution. Therefore, as shown in FIG. 1, if an electric field Ea is generated between the emitter section 14 and the collector electrode 24, the secondary electrons has their emission path determined along the electric field Ea. Therefore, the electronic pulse generation device 10A can serve as a highly straight electron source. The secondary electrons which have a low initial speed are electrons which are emitted from the solid emitter section 14 under an energy that has been generated by a coulomb collision with primary electrons.

As can be seen from FIG. 10, secondary electrons having an energy level which corresponds to the energy $E_O$ of primary electrons are emitted. These secondary electrons are primary electrons that are emitted from the cathode electrode 16 and scattered in the vicinity of the surface of the emitter section 14 (reflected electrons). The secondary electrons referred herein include both the reflected electrons and Auger electrons.

If the thickness of the cathode electrode 16 is very small (up to 10 nm), then primary electrons emitted from the cathode electrode 16 are reflected by the interface between the cathode electrode 16 and the emitter section 14, and directed toward the collector electrode 24.

The intensity $E_A$ of the electric field at the electric field concentration point A satisfies the equation $E_A=V(la, lk)/d_A$ where V(la, lk) represents the potential difference between the local anode and the local cathode, and $d_A$ represents the distance between the local anode and the local cathode. Because the distance $d_A$ between the local anode and the local cathode is very small, it is possible to easily obtain the intensity $E_A$ of the electric field which is required to emit electrons (the large intensity $E_A$ of the electric field is indicated by the solid-line arrow in FIG. 8). This ability to easily obtain the intensity $E_A$ of the electric field leads to a reduction in the voltage Vak.

As the electron emission from the cathode electrode 16 progresses, floating atoms of the emitter section 14 which are evaporated due to the Joule heat are ionized into positive ions and electrons by the emitted electrons. The electrons generated by the ionization ionize the atoms of the emitter section 14. Therefore, the electrons are increased exponentially to generate a local plasma in which the electrons and the positive ions are neutrally present. The positive ions generated by the ionization may impinge upon the cathode electrode 16, possibly damaging the cathode electrode 16.

Figure 9:
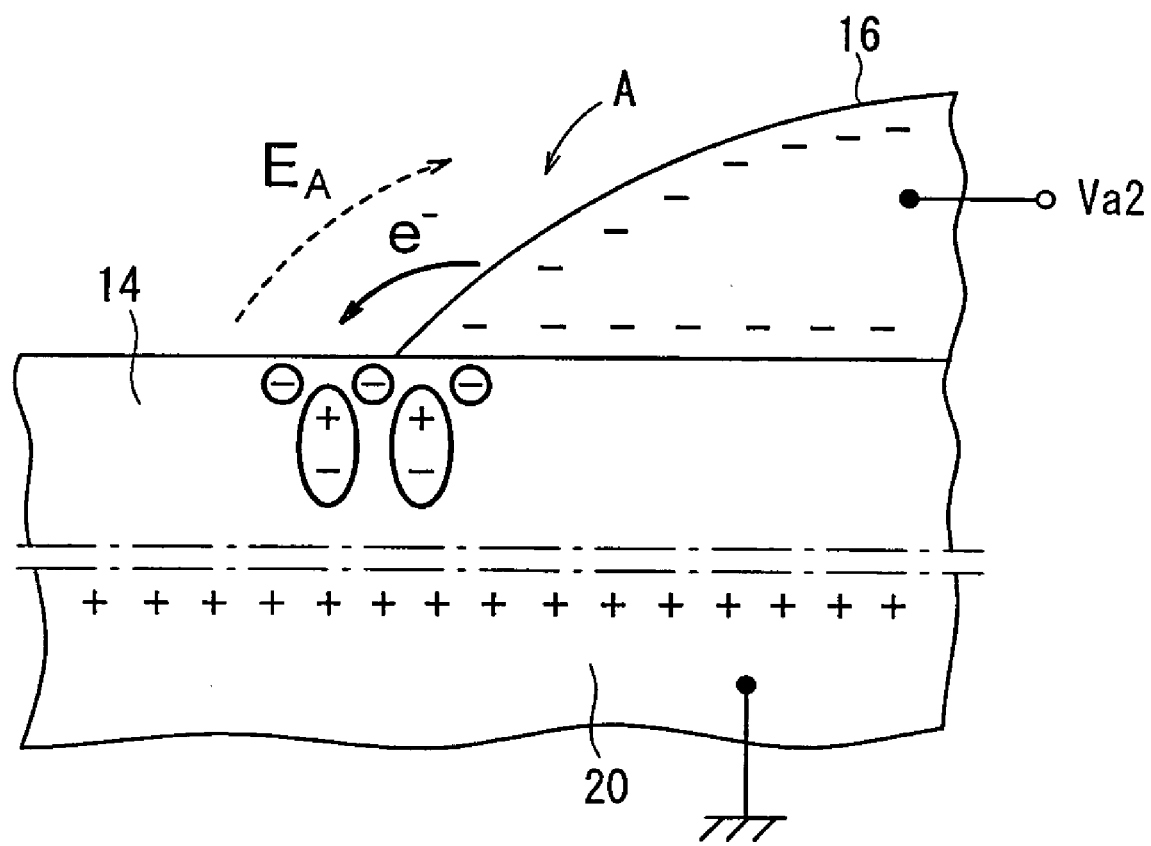
FIG. 9 is a view showing an operation in which electron emission is stopped automatically when a surface of an emitter element is charged negatively.

In the electronic pulse generation device 10A according to the first embodiment, as shown in FIG. 9, the electrons emitted from the cathode electrode 16 are attracted to the positive poles, which are present as the local anode, of the dipole elements in the emitter section 14, negatively charging the surface of the emitter section 14 near the cathode electrode 16. As a result, the factor for accelerating the electrons (the local potential difference) is lessened, and any potential for emitting secondary electrons is eliminated, further progressively negatively charging the surface of the emitter section 14.

Therefore, the positive polarity of the local anode provided by the dipole moments is weakened, and the intensity $E_A$ of the electric field between the local anode and the local cathode is reduced (the small intensity $E_A$ Of the electric field is indicated by the broken-line arrow in FIG. 9). Thus, the electron emission is stopped.

Figure 11A:
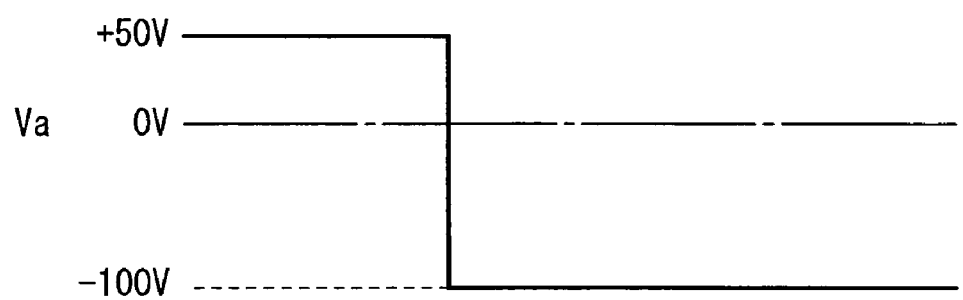
FIG. 11A is a waveform diagram showing an example (rectangular pulse waveform) of the drive voltage.
Figure 11B:
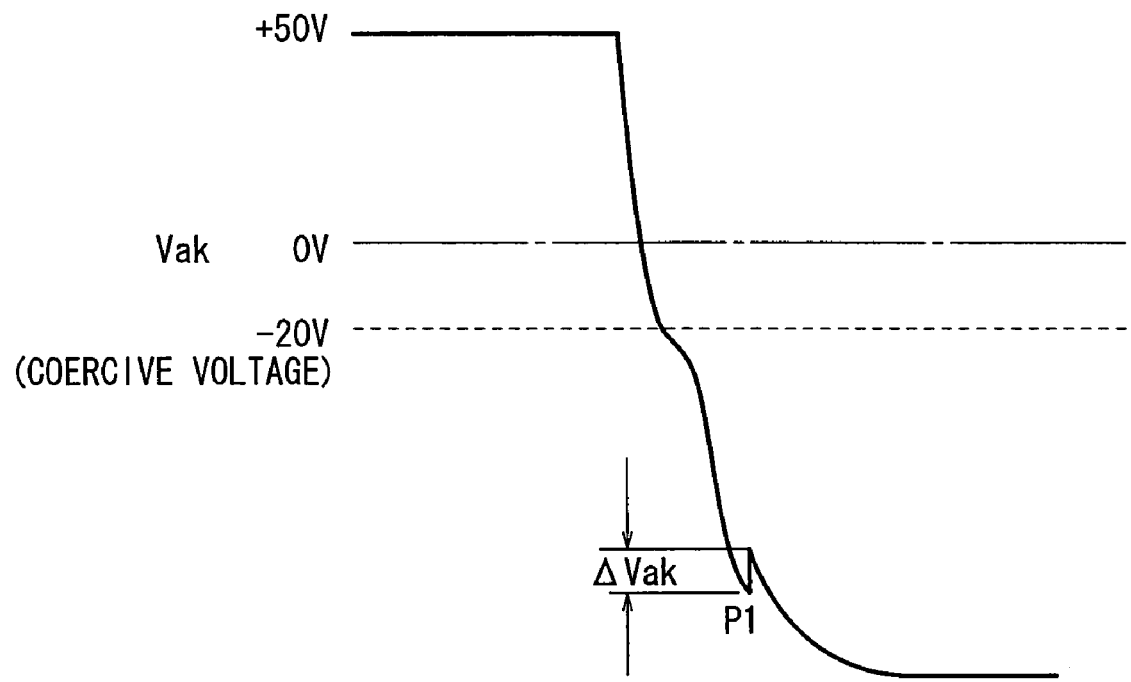
FIG. 11B is a waveform showing the change of the voltage between the anode electrode and the cathode electrode of the electronic pulse generation device according to the first embodiment of the present invention.

As shown in FIG. 11A, the drive voltage Va applied between the cathode electrode 16 and the anode electrode 20 has a positive voltage Va1 of 50 V, and a negative voltage va2 of –100V. The change ΔVak of the voltage between the cathode electrode 16 and the anode electrode 20 at the time P1 (peak) the electrons are emitted is 20V or less (about 10 V in the example of FIG. 11B), and very small. Consequently, almost no positive ions are generated, thus preventing the cathode electrode 16 from being damaged by positive ions. This arrangement is thus effective to increase the service life of the electronic pulse generation device 10A.

After the electron emission period T2, the preparatory period T1 is repeated in the next cycle. In the preparatory period T1 of the next cycle, the cathode electrode 16 of the electronic pulse generation device 10A has a potential higher than a potential of the anode electrode 20 again (the negative poles of dipole moments appear on the surface of the emitter section 14 again). Therefore, the negative charge on the emitter section 14 which caused interruption of the electron emission is eliminated. By application of the alternating pulse, a sufficient level of electric field intensity $E_A$ can be maintained in every electron emission period T2, and the electron emission can be carried out stably.

Preferably, the dielectric breakdown voltage of the emitter section 14 is at least 10 kV/mm or higher. In the embodiment, when the thickness h of the emitter section 14 is 20 μm, even if the drive voltage of –100V is applied between the cathode electrode 16 and the anode electrode 20, the emitter section 14 does not break down dielectrically.

The emitter section 14 is likely to be damaged when electrons emitted from the emitter section 14 impinge upon the emitter section 14 again or when ionization occurs near the surface of the emitter section 14. Due to the damages to the crystallization, the mechanical strength and the durability of the emitter section 14 are likely to be lowered.

In order to avoid the problem, preferably, the emitter section 14 is made of a dielectric material having a high evaporation temperature in vacuum. For example, the emitter section 14 may be made of $BaTiO_3$ which does not include Pb. Thus, the emitter section 14 is not evaporated into floating atoms easily due to the Joule heat, and the ionization by the emitted electrons is prevented. Therefore, the surface of the emitter section 14 is effectively protected.

The pattern or the potential of the collector electrode 24 may be changed suitably depending on the application. If a control electrode (not shown) or the like is provided between the emitter section 14 and the collector electrode 24 for arbitrarily setting the electric field distribution between the emitter section 14 and the collector electrode 24, the emission path of the emitted secondary electrons can be controlled easily. Thus, it is possible to change the size of the electron beam by converging and expanding the electron beam, and to change the shape of the electron beam easily.

As described above, the electron source emitting a straight electron beam is produced, and the emission path of emitted secondary electrons is controlled easily. Therefore, the electronic pulse generation device 10A according to the first embodiment can be utilized advantageously as a pixel of a display with an aim to decrease the pitch between the pixels.

Next, three specific examples of the electronic pulse generation device 10A according to the first embodiment of the present invention will be described.

First, the electronic pulse generation device 10A1 according to the first specific example will be described. The electronic pulse generation device 10A1 according to a first specific example has substantially the same structure as the electronic pulse generation device 10A according to the first embodiment described above, but differs from the electronic pulse generation device 10A in that the emitter section 14 is made of a piezoelectric material.

Figure 12:
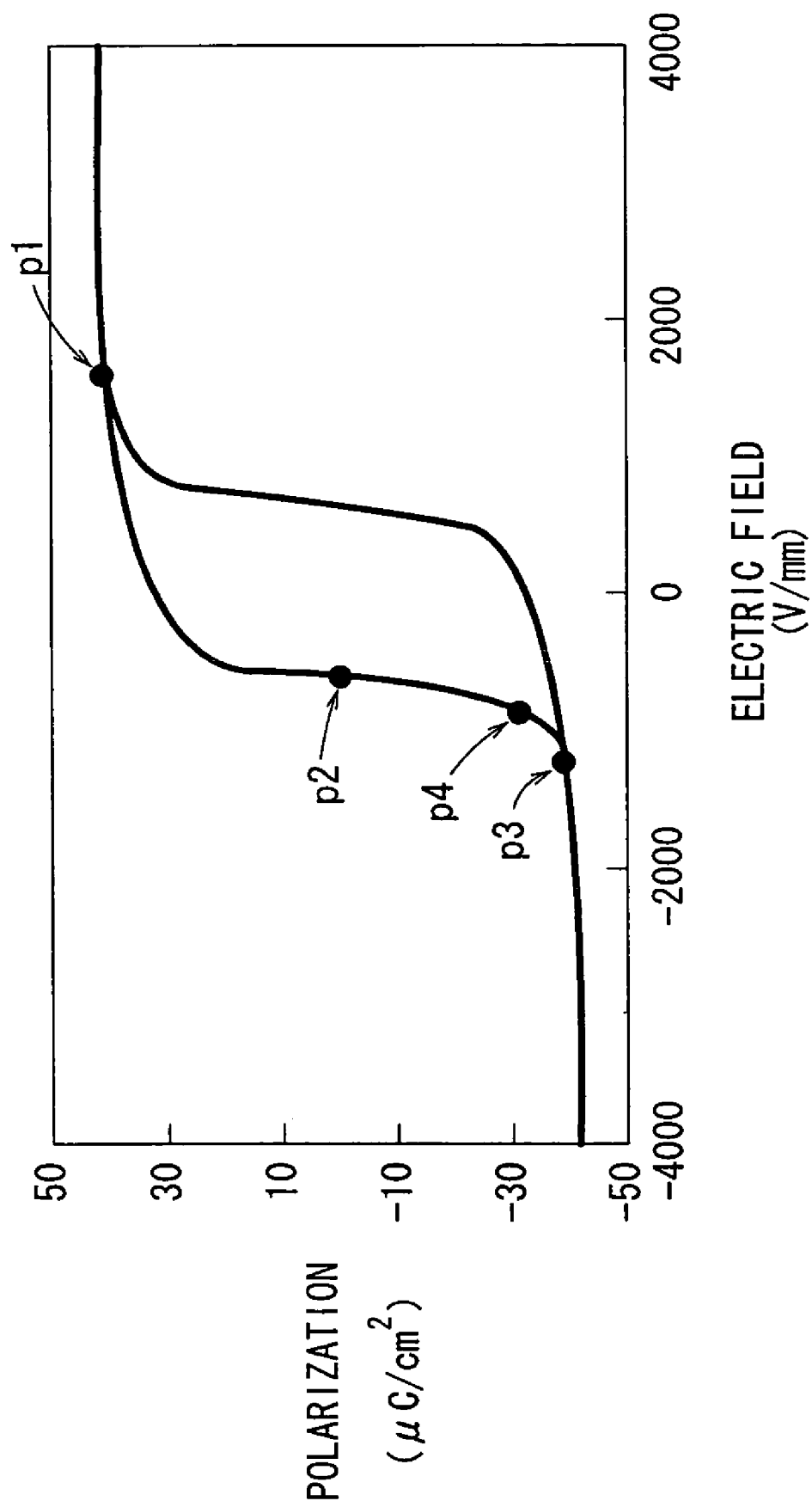
FIG. 12 is a view showing a polarization-electric field characteristic curve of a piezoelectric material.

FIG. 7 shows a polarization-electric field characteristic curve of the piezoelectric material of the emitter section 14. In FIG. 12, a hysteresis loop is shown around a level where the electric field E=0 (V/mm).

The hysteresis loop from a point p1, a point p2, to a point p3 will be described. When a positive electric field is applied to the piezoelectric material at the point p1, the piezoelectric material is polarized substantially in one direction. Thereafter, when the electric field is negatively increased to a level of a coercive field (about −700V/mm) at the point p2, polarization reversal starts to occur. At the point p3, polarization reversal is carried out completely.

Figure 13:
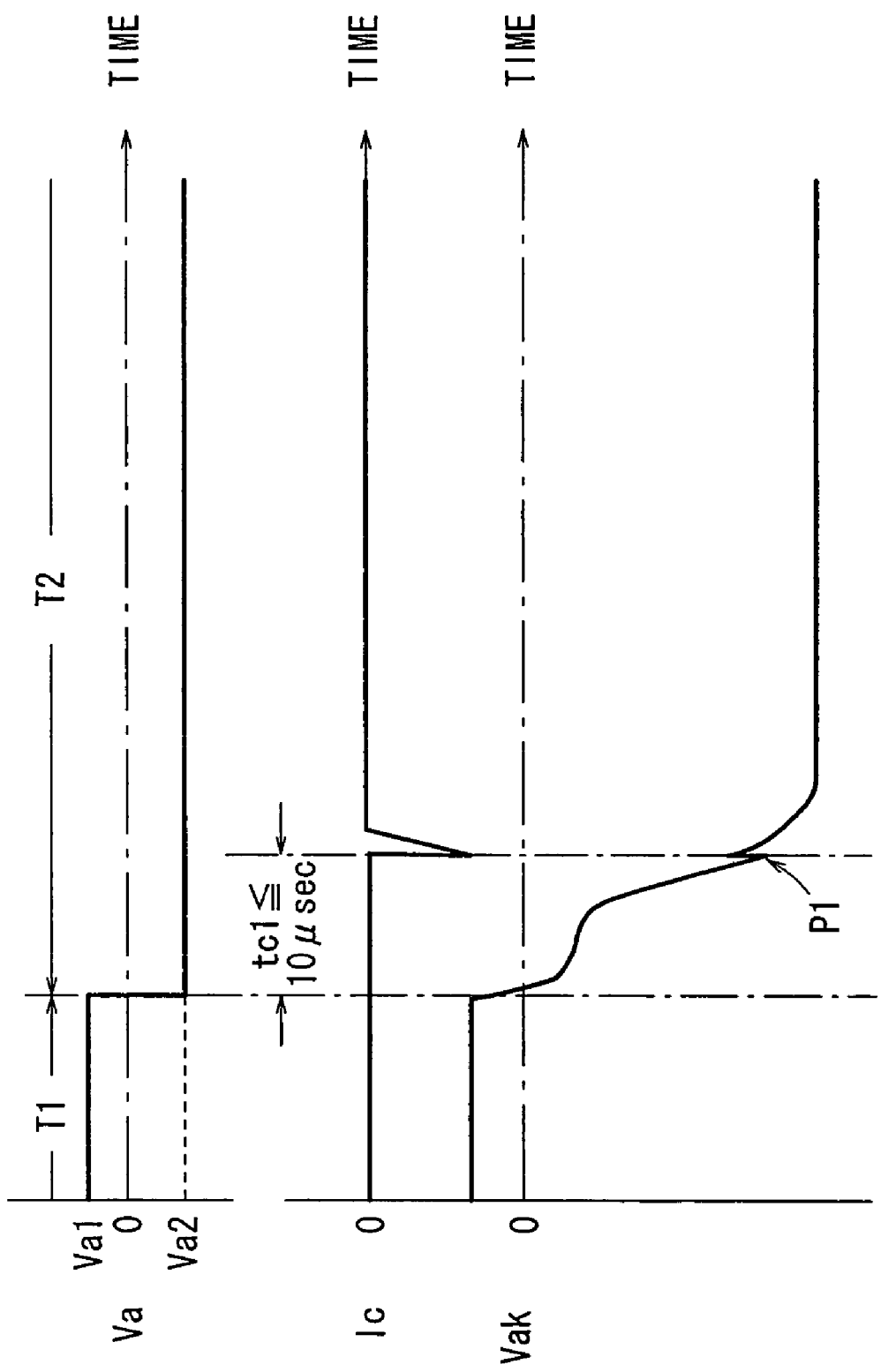
FIG. 13 is a waveform diagram showing changes in the drive voltage applied between the cathode electrode and the anode electrode, a collector current flowing through a collector electrode, and a voltage between the cathode electrode and the anode electrode in an electronic pulse generation device according to the first specific example.

In the first specific example, as shown in FIG. 13, a first voltage Va1 is applied between the cathode electrode 16 and the anode electrode 20, and a positive electric field (about 1000V/mm) is applied to the emitter section 14 in the preparatory period T1. At this time, as shown in the polarization-electric field characteristic curve in FIG. 12, the emitter section 14 is polarized in one direction.

Thereafter, in the electron emission period T2 shown in FIG. 13, when a second voltage Va2 is applied between the cathode electrode 16 and the anode electrode 20, for rapidly changing the electric field to a level (e.g., about −1000V/mm) beyond the level of the coercive field, electron emission starts to occur at the point p4, before the point p3 shown in FIG. 12. As shown in FIG. 13, within a certain period tc1 (10 μsec or less in this example) from the beginning of the electron emission period T2, at a the time P1 when the voltage Vak between the cathode electrode 16 and the anode electrode 20 is a peak, small voltage drop occurs. The electron emission occurs at the time P1 (peak). At the time P1 (peak), a current (collector current Ic) flows the collector electrode 24 rapidly, i.e., the emitted electrons are collected by the collector electrode 24.

As described above, the second voltage Va2 is applied between the cathode electrode 16 and the anode electrode 20, for causing emission of the secondary electrons from the emitter section 14 or from the interface between the cathode electrode 16 and the emitter section 14.

After the electron emission, the voltage Vak between the cathode electrode 16 and the anode electrode 20 is increased again by the second voltage Va2 applied to the cathode electrode 16. However, since the voltage drop at the time of the electron emission is small (about 20V), the electron emission does not occur after the first electron emission.

In the electronic pulse generation device 10A1 according to the first specific example, the electric field beyond the level of the coercive field is rapidly applied to the emitter section 14 which is polarized in one direction. Therefore, the electrons are emitted efficiently, and the electronic pulse generation device 10A1 can be utilized easily in displays or light sources.

The electric field for inducing electron emission (the electric field at the point p4) is beyond the level of the coercive field. In the electric field for electron emission, the polarization reversal is almost completed. The levels of the electric fields do not change substantially. Therefore, the electronic pulse generation device 10A1 has digital-like electron emission characteristics. The level of the electric field for electron emission depends on the coercive field. When the level of the coercive field is small, the electronic pulse generation device 10A1 can be operated at a low voltage.

In the electronic pulse generation device 10A1, the level of the second voltage Va2 applied between the cathode electrode 16 and the anode electrode 20 is controlled for applying an electric field beyond the level of the coercive field to the emitter section 14 within a certain period tc1 (e.g., 10 μsec or less) from the beginning of the electron emission period T2.

Figure 14A:
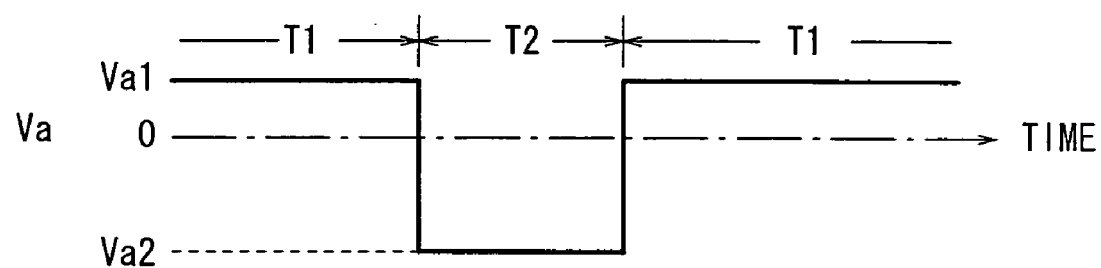
FIG. 14A is a waveform diagram showing an example (rectangular pulse waveform) of the drive voltage.
Figure 14B:
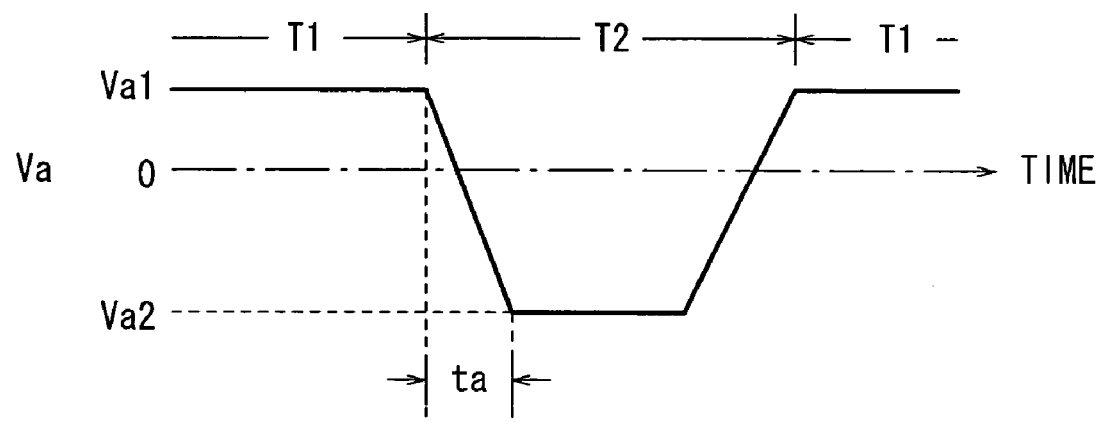
FIG. 14B is a waveform diagram showing another example (pulse waveform having a ramp falling edge) of the drive voltage.

In this case, the level of the second voltage Va2 is controlled in the following manner. If the second voltage Va2 has a rectangular pulse waveform as shown in FIG. 14A, the maximum amplitude (=Va2) is controlled, and if the second voltage Va2 has a pulse waveform having a falling edge (ramp) as shown in FIG. 14B, for example, the maximum amplitude (=Va2) or a transition time ta (a period from the beginning of the electron emission period T2 until the voltage reaches the maximum amplitude) is controlled.

In the electronic pulse generation device 10A1 according to the first specific example, if the electron emission needs to be repeated, a drive voltage Va having an alternating waveform including positive and negative pulses can be used for carrying out the successive electron emissions easily.

Next, an electronic pulse generation device 10A2 according to a second specific example will be described. The electronic pulse generation device 10A2 according to the second specific example has substantially the same structure as the electronic pulse generation device 10A according to the first embodiment described above, but differs from the electronic pulse generation device 10A in that the emitter section 14 is made of an anti-ferroelectric material.

Figure 15:
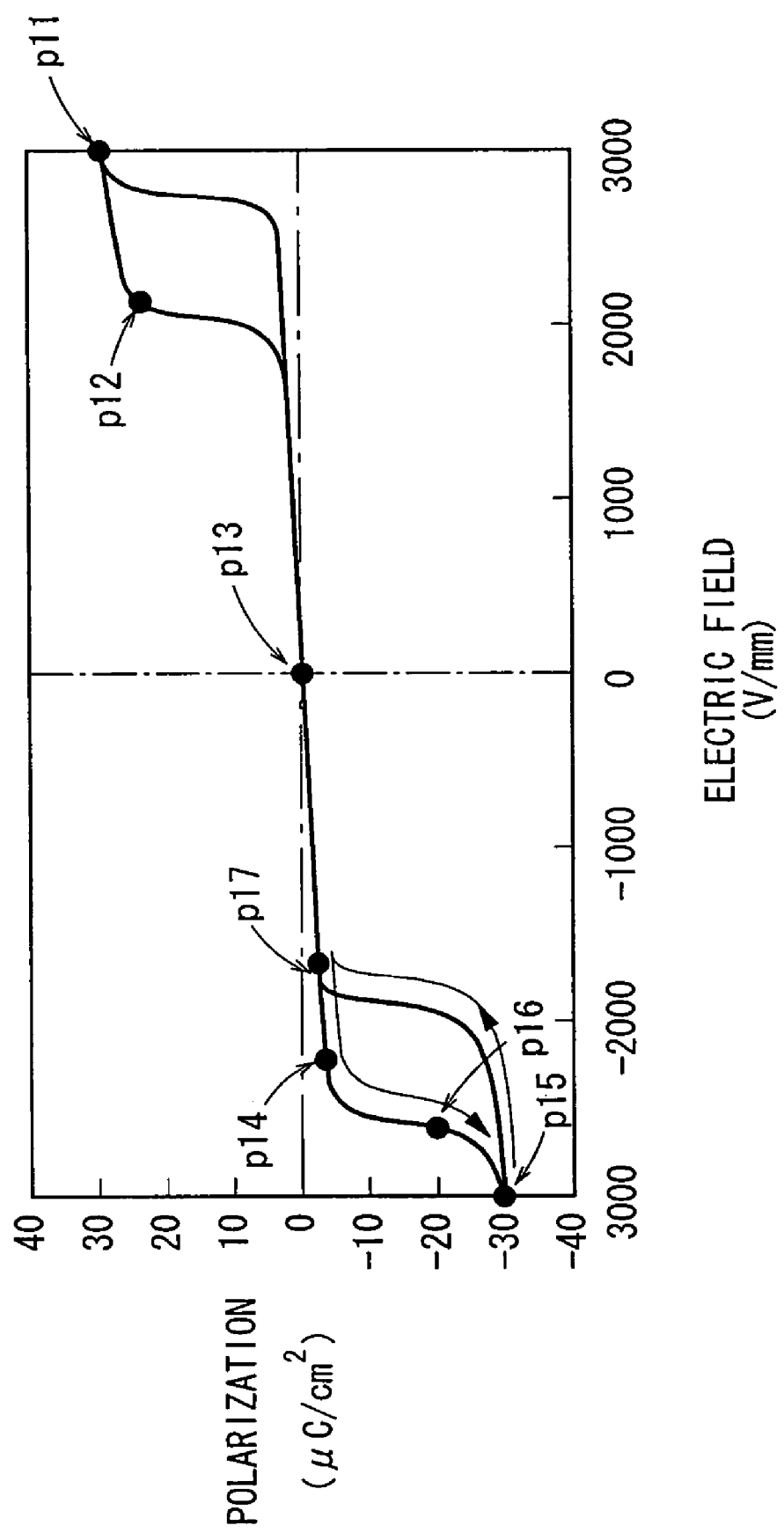
FIG. 15 is a view showing a polarization-electric field characteristic curve of an anti-ferroelectric material.

As shown in FIG. 15, the polarization of the anti-ferroelectric material is induced proportionally to the voltage in a small electric field. In a large electric field beyond a certain level, the anti-ferroelectric material functions as a ferroelectric material (electric field induced phase transition). Hysteresis loops are shown in the positive electric field and the negative electric field. When application of the electric field is stopped, the anti-ferroelectric material functions as a dielectric material (polarization is reset).

The hysteresis loop in the positive electric field from a point p11, a point p12, to a point p13 will be described. The anti-ferroelectric material is polarized almost in one direction when the positive electric field is applied at the point p11. Then, the intensity of the electric field is decreased. From the point 12 to point 13, the amount of polarization decrease significantly. The anti-ferroelectric material functions as a dielectric material at the point p13 where the electric field is zero, and the polarization is reset. Then, when the negative electric field is applied, a phase transition occurs in the emitter section 14, and the emitter section 14 functions as a ferroelectric material. When the electric field is negatively increased beyond a level of about −2300V/mm at the point p14, polarization reversal of the emitter section 14 is started. At the point p15, the emitter section 14 is polarized in the opposite direction.

Figure 16:
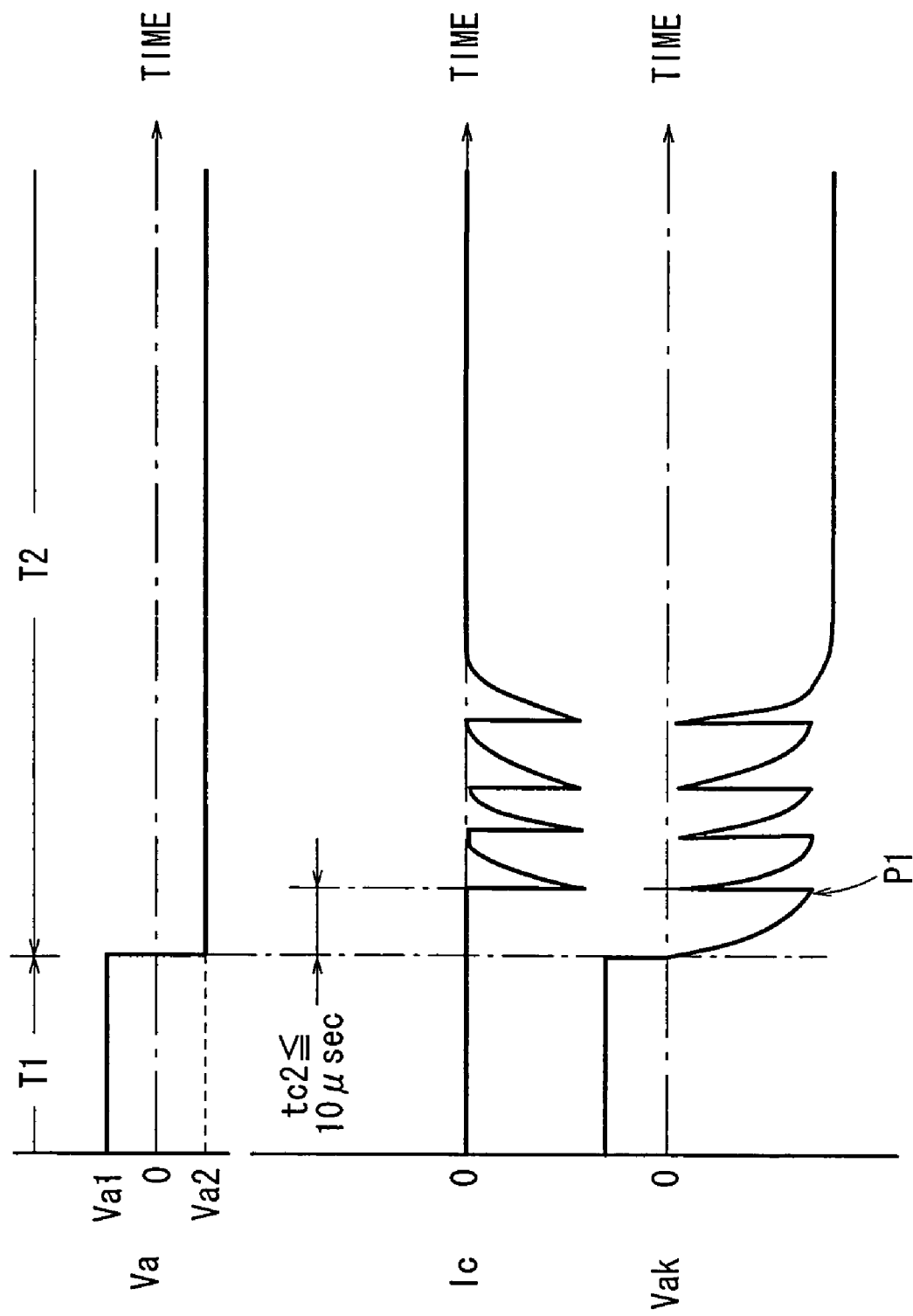
FIG. 16 is a waveform diagram showing changes in the drive voltage applied between the cathode electrode and the anode electrode, a collector current flowing the collector electrode, and the voltage between the cathode electrode and the anode electrode in an electronic pulse generation device according to the second specific example.

In the second specific example, as shown in FIG. 16, the first voltage Va1 is applied between the cathode electrode 16 and the anode electrode 20 for applying the positive electric field (about 3000V/nm) to the emitter section 14. As shown in the polarization-electric field characteristic curve in FIG.

15, the emitter section 14 is polarized in one direction. The first voltage Va1 applied between the cathode electrode 16 and the anode electrode 20 in the preparatory period T1 may be a reference voltage (0v). In this case, no electric field is applied to the emitter section 14. At this time, as shown in the polarization-electric field characteristic curve, the polarization of the emitter section 14 is reset.

Thereafter, in the electron emission period T2, a second voltage Va2 is applied between the cathode electrode 16 and the anode electrode 20 for rapidly applying an electric field (e.g., about −3000V/mm) to the emitter section 14 to change the polarization of the emitter section 14. At a point p16 before the point p15 shown in FIG. 15, electron emission starts to occur.

As shown in FIG. 16, within a certain period tc2 (10 μsec or less in this example) from the beginning of the electron emission period T2, at a time P1 when the voltage Vak between the cathode electrode 16 and the anode electrode 20 is a peak, a voltage drop occurs. The electron emission occurs at the time P1 (peak). At the time P1 (peak), a current (collector current Ic) flows the collector electrode 24 rapidly, i.e., the emitted electrons are collected by the collector electrode 24.

When the phase transition from the anti-ferroelectric material to the ferroelectric material occurs, the difference between the electric field for inducing electron emission (the electric field at the point p16) and the electric field for resetting polarization (the electric field at the point p17) is small. Therefore, when electron emission occurs to cause the drop in the voltage between the cathode electrode 16 and the anode electrode 20, the polarization in the emitter section 14 is reset easily, and the emitter section 14 is brought into a condition as if a reference voltage 0V were applied.

In the electron emission period T2, since the second voltage Va2 is applied between the cathode electrode 16 and the anode electrode 20, the voltage Vak between the cathode electrode 16 and the anode electrode 20 rapidly reaches the voltage level required for electron emission, and the electron emission starts to occur again.

Therefore, by continuously applying the second voltage Va2 in the electron emission period T2, the above sequential operation is repeated successively. By controlling the level of the second voltage Va2, the number of the operations can be controlled. In the example of FIG. 16, electrons are emitted four times successively.

As described above, in the electronic pulse generation device 10A2 according to the second specific example, the electric field is applied to the emitter section 14 rapidly for causing phase transition in the emitter section 14 into a ferroelectric material and changing polarization of the emitter section 14. Therefore, the electrons are emitted efficiently, and the electronic pulse generation device 10A2 can be utilized easily in displays or light sources.

In the electric field for inducing electron emission (the electric field at the point p16), polarization reversal is almost completed. The levels of the electric fields do not change substantially. Therefore, the electronic pulse generation device 10A2 has digital-like electron emission characteristics. The electric field for electron emission depends on the electric field for inducing phase transition of the emitter section 14 into the ferroelectric material. When the level of the electric field for inducing phase transition is small, the electronic pulse generation device 10A2 is operated at a low voltage.

In the electronic pulse generation device 10A2, polarization is reset without applying the positive electric field. Electron emission in the electron emission period T2 can be carried out by the single polarity operation (negative polarity). Thus, the driving circuit system is simplified. The electronic pulse generation device 10A2 can be operated by small energy consumption at a low cost with a compact structure.

The level (the maximum amplitude or phase transition period ta) of the second voltage Va2 applied between the cathode electrode 16 and the anode electrode 20 is controlled for applying an electric field to induce the phase transition of the emitter section 14 within a certain period tc2 (e.g., 10 μsec or less) from the beginning of the electron emission period T2, and polarize the emitter section 14.

Next, an electronic pulse generation device 10A3 according to a third specific example will be described. The electronic pulse generation device 10A3 according to the third specific example has substantially the same structure as the electronic pulse generation device 10A according to the first embodiment described above, but differs from the electronic pulse generation device 10A in that the emitter section 14 is made of an electrostrictive material.

Figure 17:
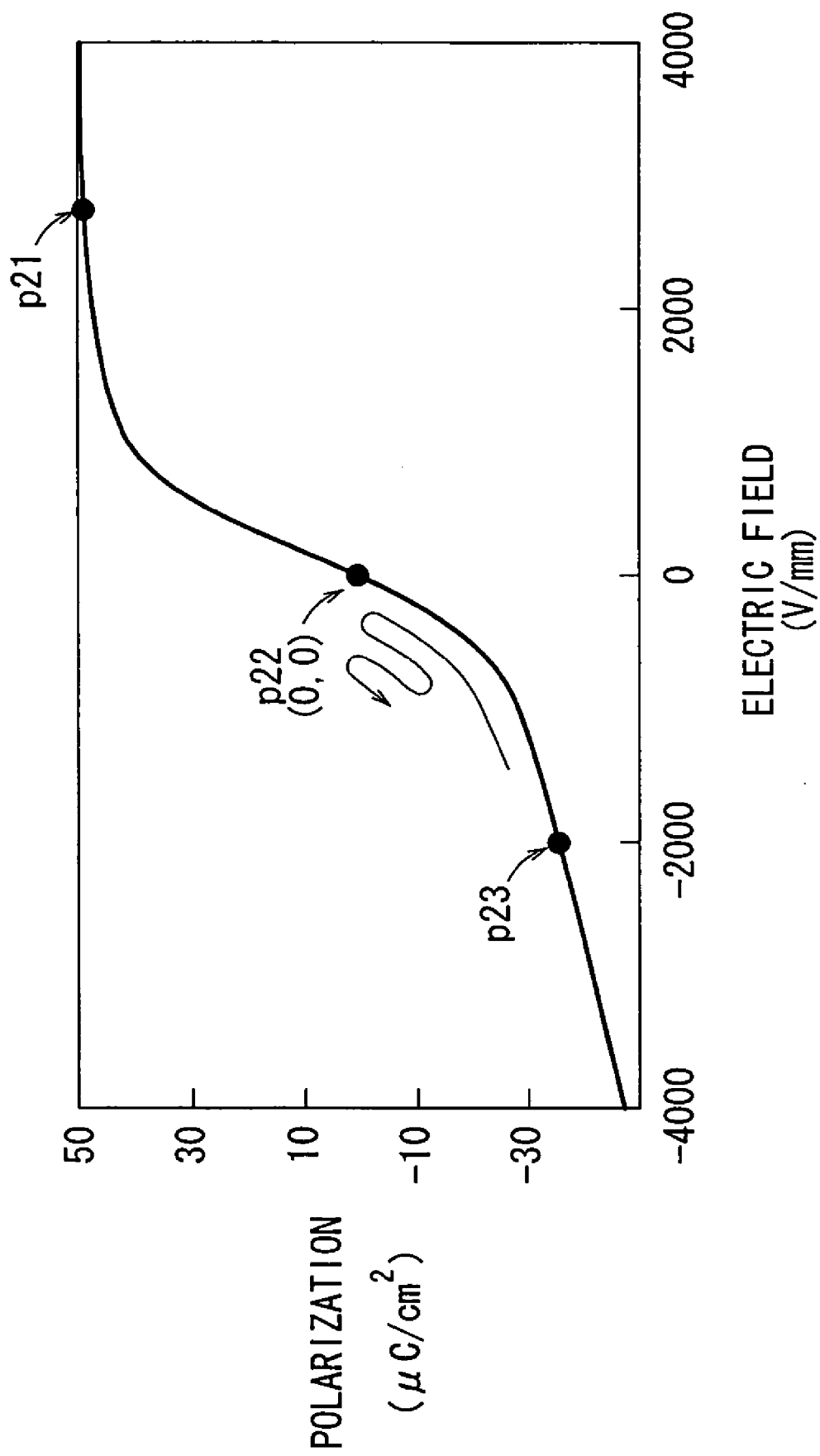
FIG. 17 is a view showing a polarization-electric field characteristic curve of an electrostrictive material.

As shown in FIG. 17, the polarization of the electrostrictive material is induced substantially proportionally to the electric field. The rate of change in the polarization is large in a small electric field in comparison with a large electric field. The polarization-occurs gradually according to the change of the electric field. When no electric field is applied, the polarization is reset.

The characteristics curve from a point p21 to a point p23 will be described. At the point p21, where a positive electric field is applied, the electrostrictive material of the emitter section 14 is polarized almost in one direction. Then, as the intensity of the electric field is decreased from the point p21 to the point 22, the amount of the polarization is decreased corresponding to the intensity of the positive electric field. At the point p22 where the intensity of the electric field is 0, the electrostrictive material functions as a dielectric material. Thereafter, as the intensity of the negative electric field is increased from the point p22 to the point p23, the polarization is reversed gradually into the opposite direction. At the point p23, the emitter section 14 is almost polarized in the opposite direction. The amount of the polarization in the emitter section 14 is proportional to the intensity of the applied electric field.

Figure 18:
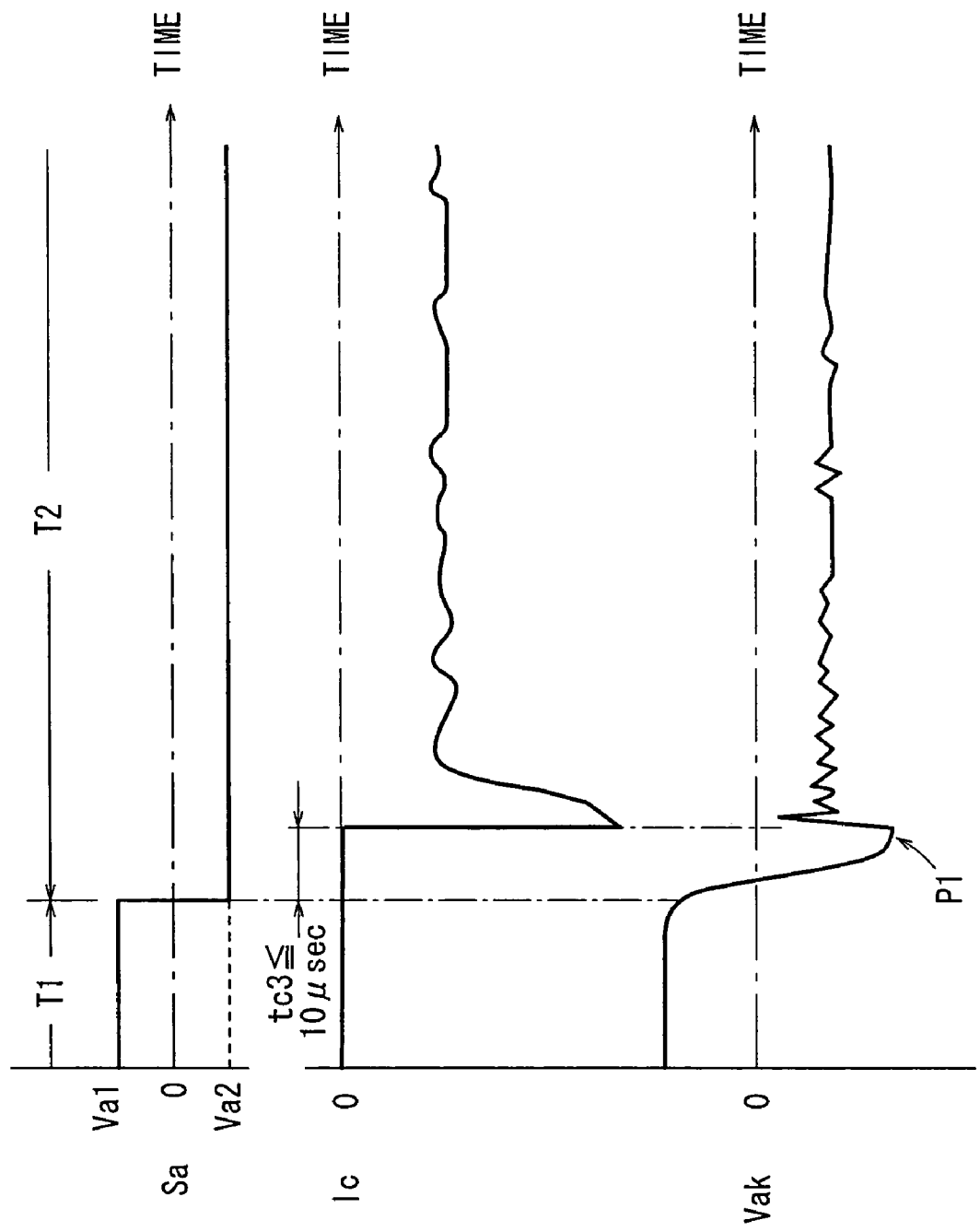
FIG. 18 is a waveform diagram showing changes in the drive voltage applied between the cathode electrode and the anode electrode, a collector current flowing the collector electrode, and the voltage between the cathode electrode and the anode electrode in an electronic pulse generation device according to the third specific example.

In the third specific example, as shown in FIG. 18, a first voltage Va1 is applied between the cathode electrode 16 and the anode electrode 20 for applying the positive electric field (about 2000V/nm) to the emitter section 14. As shown in the polarization-electric field characteristic curve in FIG. 17, the emitter section 14 is polarized in one direction. The first voltage Va1 applied between the cathode electrode 16 and the anode electrode 20 in the preparatory period T1 may be a reference voltage (0v). In this case, no electric field is applied to the emitter section 14. At this time, as shown in the polarization-electric field characteristic curve, the polarization of the emitter section 14 is reset.

Thereafter, in the electron emission period T2, a second voltage Va2 is applied between the cathode electrode 16 and the anode electrode 20 for rapidly applying an electric field (e.g., about −2000V/mm) to the emitter section 14 to change the polarization of the emitter section 14. At the point p23, electron emission starts to occur. As shown in FIG. 18, within a certain period tc3 (10 μsec or less in this example) from the beginning of the electron emission period T2, at a time P1 when the voltage Vak between the cathode electrode 16 and the anode electrode 20 is a peak, a voltage drop occurs. The electron emission occurs at the time P1 (peak). At the time P1 (peak), a current (collector current Ic) flows the collector electrode 24 rapidly, i.e., the emitted electrons are collected by the collector electrode 24.

In the electronic pulse generation device 10A3 according to the third specific example, the emitter section 14 is polarized gradually according to the change of the electric field. When the amount of polarization per unit time is large, the number of emitted electrons is large. Therefore, the electronic pulse generation device 10A3 has analog-like electron emission characteristics.

The potential difference between the electric field for inducing electron emission (the electric field at the point p23) and the electric field for resetting polarization (the electric field at the point p22) is small. Therefore, when electron emission occurs to cause the drop in the voltage between the cathode electrode 16 and the anode electrode 20, the polarization in the emitter section 14 is reset easily, and the emitter section 14 is brought into a condition as if the reference voltage 0V were applied.

In the electron emission period T2, the second voltage Va2 is applied between the cathode electrode 16 and the anode electrode 20. Therefore, the voltage Vak between the cathode electrode 16 and the anode electrode 20 is increased rapidly. At this time, the change in the polarization progresses rapidly. Thus, the electrons are emitted at a voltage lower than the voltage for the first electron emission.

After the second electron emission to cause the drop in the voltage between the cathode electrode 16 and the anode electrode 20, the polarization of the emitter section 14 is reset again easily. Thereafter, by continuously applying the second voltage Va2 between the cathode electrode 16 and the anode electrode 20, the voltage Vak between the cathode electrode 16 and the anode electrode 20 is increased again to polarize the emitter section 14. Again, the change in the polarization progresses rapidly, and the electron emission occurs at a voltage substantially same as the voltage for the second electron emission.

After the first electron emission, the voltage Vak between the cathode electrode 16 and the anode electrode 20 fluctuates slightly. The slight fluctuation keeps the electron emission. By controlling the level of the second voltage Va2, it is possible to control the duration of the electron emission.

As described above, in the electronic pulse generation device 10A3 according to the third specific example, the amount of polarization in the emitter section 14 is controlled for efficiently emitting the electrons. Thus, the electronic pulse generation device 10A3 can be utilized easily in displays or light sources.

As described above, when the amount of the polarization per unit time is large, the intensity of the electric field can be small. Therefore, the electronic pulse generation device 10A3 can be operated at a low voltage.

In the electronic pulse generation device 10A3, polarization is reset without applying the positive electric field. Electron emission in the electron emission period T2 can be carried out by the single polarity operation (negative polarity). Thus, the driving circuit system is simplified. The electronic pulse generation device 10A3 can be operated by small energy consumption at a low cost with a compact structure.

The level (the maximum amplitude or phase transition period ta) of the second voltage Va2 applied between the cathode electrode 16 and the anode electrode 20 is controlled for controlling the amount of polarization in the emitter section 14 within a certain period tc3 (e.g., 10 μsec or less) from the beginning of the electron emission period T2 and controlling the number of emitted electrons.

Next, an electronic pulse generation device 10B according to a second embodiment will be described with reference to FIG. 19.

Figure 19:
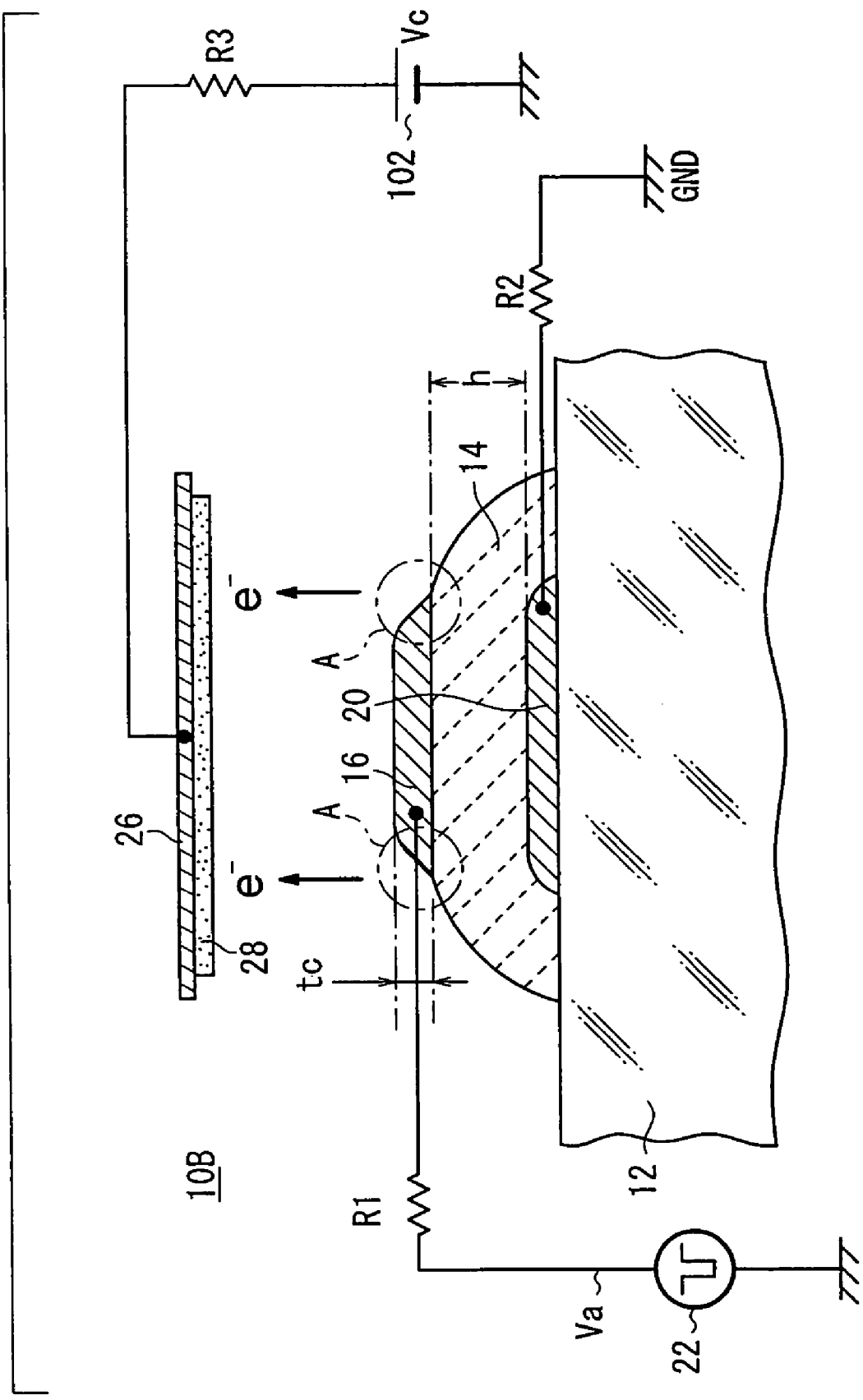
FIG. 19 is a view showing an electronic pulse generation device according to a second embodiment.

As shown in FIG. 19, the electronic pulse generation device 10B according to the second embodiment has substantially the same structure as the electronic pulse generation device 10A according to the first embodiment, but differs from the electronic pulse generation device 10A in that the electronic pulse generation device 10B includes one substrate 12, an anode electrode 20 is formed on the substrate 12, the emitter section 14 is formed on the substrate 12 to cover the anode electrode 20, and the cathode electrode 16 is formed on the emitter section 14.

As with the electronic pulse generation device 10A according to the first embodiment, the electronic pulse generation device 10B can prevent the damages of the cathode electrode 16 by the positive ions, and has a long service life.

The emitter section 14 may be formed on the substrate 12 by any of various thick-film forming processes including screen printing, dipping, coating, electrophoresis, etc., or any of various thin-film forming processes including an ion beam process, sputtering, vacuum evaporation, ion plating, chemical vapor deposition (CVD), plating, etc.

In the second embodiment, the emitter section 14 is formed suitably by any of various thick-film forming processes including screen printing, dipping, coating, electrophoresis, etc.

These thick-film forming processes are capable of providing good piezoelectric operating characteristics as the emitter section 16 can be formed using a paste, a slurry, a suspension, an emulsion, a sol, or the like which is chiefly made of piezoelectric ceramic particles having an average particle diameter ranging from 0.01 to 5 μm, preferably from 0.05 to 3 μm.

In particular, electrophoresis is capable of forming a film at a high density with high shape accuracy, and has features described in technical documents such as "Electrochemistry Vol. 53. No. 1 (1985), p. 63–68, written by Kazuo Anzai", and "The $1^{st}$ Meeting on Finely Controlled Forming of Ceramics Using Electrophoretic Deposition Method, Proceedings (1998), p. 5–6, p. 23–24". The piezoelectric/electrostrictive/anti-ferroelectric material may be formed into a sheet, or laminated sheets. Alternatively, the laminated sheets of the piezoelectric/electrostrictive/anti-ferroelectric material may be laminated on, or attached to another supporting substrate. Any of the above processes may be chosen in view of the required accuracy and reliability.

The substrate 12 should preferably be made of an electrically insulative material depending on the electrical circuit requirements. Thus, the substrate 12 may be made of a highly heat-resistant metal or a metal material such as an enameled metal whose surface is coated with a ceramic material such as glass or the like. However, the substrate 12 should preferably be made of ceramics.

Ceramics which the substrate 12 is made of include stabilized zirconium oxide, aluminum oxide, magnesium oxide, titanium oxide, spinel, mullite, aluminum nitride, silicon nitride, glass, or a mixture thereof. Of these ceramics, aluminum oxide or stabilized zirconium oxide is preferable from the standpoint of strength and rigidity. Stabilized zirconium oxide is particularly preferable because its mechanical strength is relatively high, its tenacity is relatively high, and its chemical reaction with the cathode electrode 16 and the anode electrode 20 is relatively small. Stabilized zirconium oxide includes stabilized zirconium oxide and partially stabilized zirconium oxide. Stabilized zirconium oxide does not develop a phase transition as it has a crystalline structure such as a cubic system.

Zirconium oxide develops a phase transition between a monoclinic system and a tetragonal system at about 1000° C. and is liable to suffer cracking upon such a phase transition. Stabilized zirconium oxide contains 1 to 30 mol % of a stabilizer such as calcium oxide, magnesium oxide, yttrium oxide, scandium oxide, ytterbium oxide, cerium oxide, or an oxide of a rare earth metal. For increasing the mechanical strength of the substrate 12, the stabilizer should preferably contain yttrium oxide. The stabilizer should preferably contain 1.5 to 6 mol % of yttrium oxide, or more preferably 2 to 4 mol % of yttrium oxide, and furthermore should preferably contain 0.1 to 5 mol % of aluminum oxide.

The crystalline phase may be a mixed phase of a cubic system and a monoclinic system, a mixed phase of a tetragonal system and a monoclinic system, a mixed phase of a cubic system, a tetragonal system, and a monoclinic system, or the like. The main crystalline phase which is a tetragonal system or a mixed phase of a tetragonal system and a cubic system is optimum from the standpoints of strength, tenacity, and durability.

If the substrate 12 is made of ceramics, then the substrate 12 is made up of a relatively large number of crystalline particles. For increasing the mechanical strength of the substrate 12, the crystalline particles should preferably have an average particle diameter ranging from 0.05 to 2 μm, or more preferably from 0.1 to 1 μm.

Each time the emitter section 14, the cathode electrode 16, or the anode electrode 20 is formed, the assembly is heated (sintered) into a structure integral with the substrate 12. After the emitter section 14, the cathode electrode 16, and the anode electrode 20 are formed, they may simultaneously be sintered so that they may simultaneously be integrally coupled to the substrate 12. Depending on the process by which the cathode electrode 16 and the anode electrode 20 are formed, they may not be heated (sintered) so as to be integrally combined with the substrate 12.

The sintering process for integrally combining the substrate 12, the emitter section 16, the cathode electrode 16, and the anode electrode 20 may be carried out at a temperature ranging from 500 to 1400° C., preferably from 1000 to 1400° C. For heating the emitter section 14 which is in the form of a film, the emitter section 14 should be sintered together with its evaporation source while their atmosphere is being controlled so that the emitter section 14 does not have an unstable composition due to the high temperature.

The emitter section 14 may be covered with an appropriate member for preventing the surface thereof from being directly exposed to the sintering atmosphere when the emitter section 14 is sintered. The covering member should preferably be made of the same material as the substrate 12.

Next, an electronic pulse generation device 10C according to a third embodiment will be described with reference to FIGS. 20 through 24B.

The electronic pulse generation device 10B according to the second embodiment has substantially the same structure as the electronic pulse generation device 10A according to the first embodiment described above, but differs from the electronic pulse generation device 10A in that both the cathode electrode 16 and the anode electrode 20 are disposed on one surface of the emitter section 14, with a slit 18 defined between the cathode electrode 16 and the anode electrode 20, the emitter section 14 being partly exposed through said slit 18.

Figure 20:
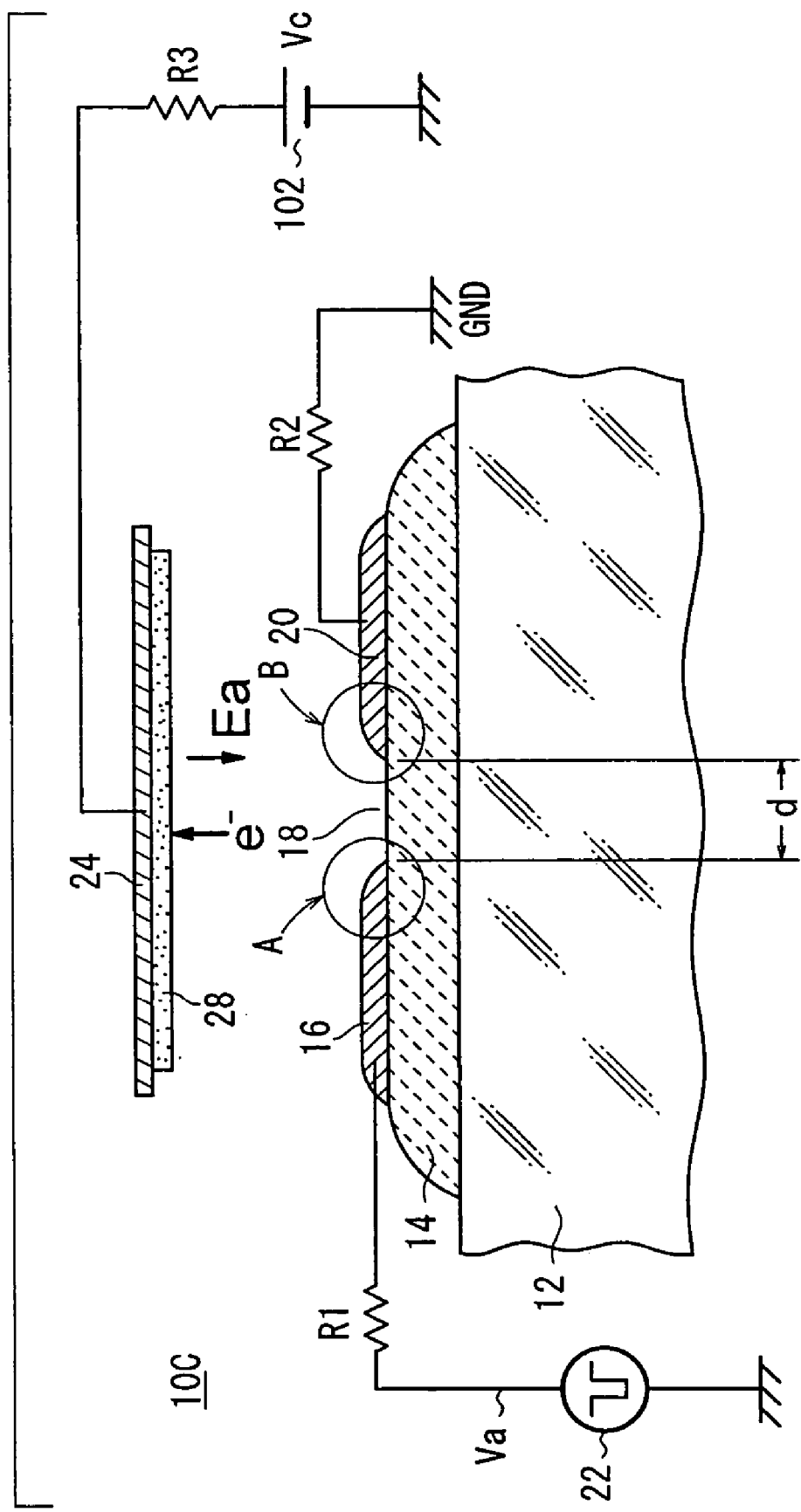
FIG. 20 is a view showing an electronic pulse generation device according to a third embodiment.

As shown in FIG. 20, the electronic pulse generation device 10C has electric field concentration points A, B. The point A can also be defined as a triple point where the cathode electrode 16, the emitter section 14, and a vacuum are present at one point. The point B can also be defined as a triple point where the anode electrode 20, the emitter section 14, and a vacuum are present at one point.

The width d of the slit 18 between the cathode electrode 16 and the anode electrode 20 is determined so that polarization reversal occurs in the electric field E represented by $E=Vak/d$ (Vak is a voltage between the cathode electrode 16 and the anode electrode 20). If the width d of the slit 18 is small, the polarization reversal occurs at a low voltage, and electrons are emitted at the low voltage (e.g., less than 100V).

Figure 21:
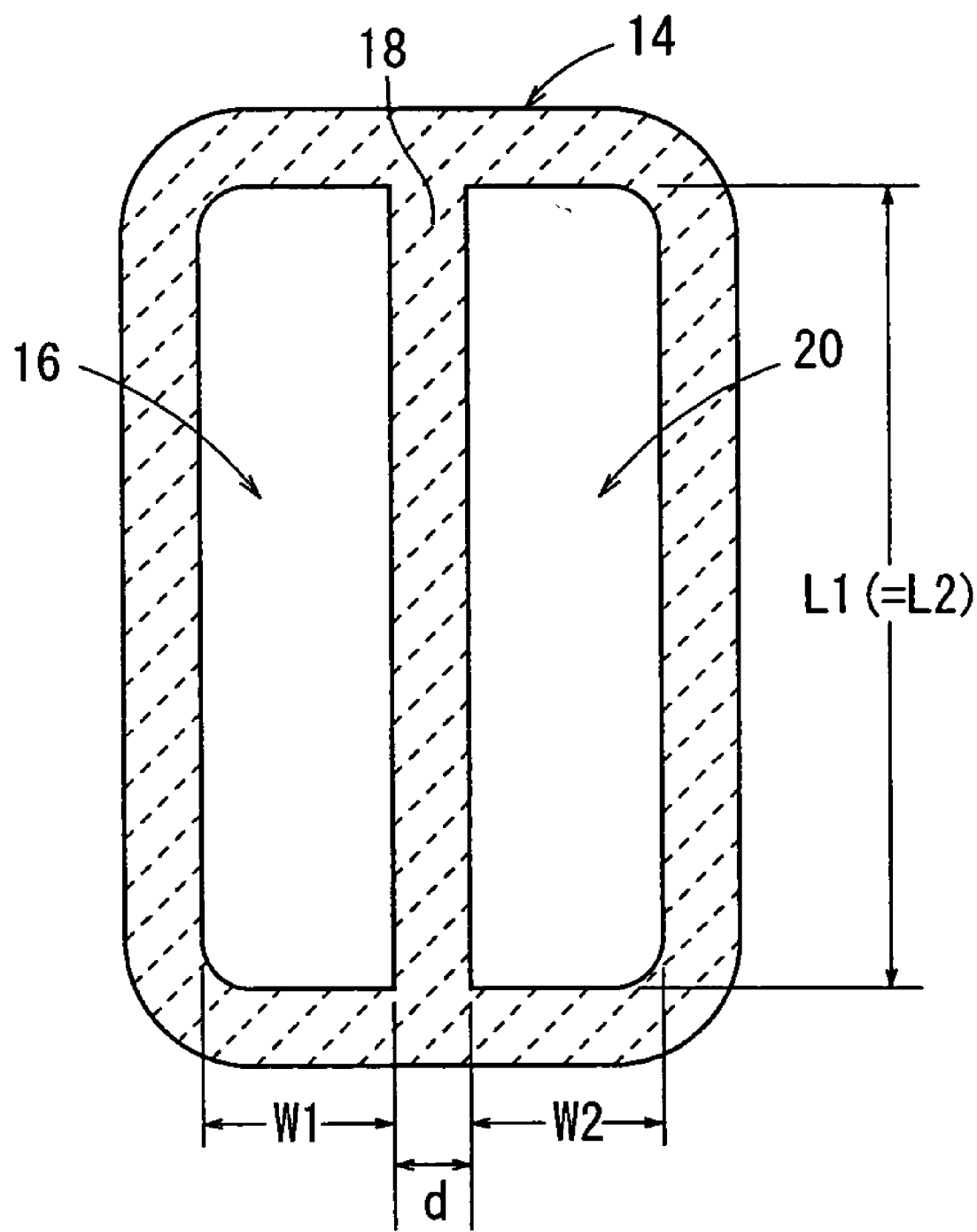
FIG. 21 is a plan view showing electrodes of the electronic pulse generation device according to the third embodiment of the present invention.

Dimensions of the cathode electrode 16 will be described with reference to FIG. 21. In FIG. 21, the cathode electrode 16 has a width W1 of 2 mm, and a length L1 of 5 mm. Preferably, the cathode electrode 16 has a thickness of 20 μm or less, or more preferably 5 μm or less.

Preferably, the anode electrode 20 is made by any of the above thick-film forming processes. Preferably, the anode electrode 20 has a thickness of 20 μm or less, or more preferably 5 μm or less. In FIG. 21, the anode electrode 20 has a width W2 of 2 mm, and a length L2 of 5 mm as with the cathode electrode 16.

In the embodiment of the present invention, the width d of the slit 18 between the cathode electrode 16 and the anode electrode 20 is 70 μm.

The principles of electron emission of the electronic pulse generation device 10C will be described below with reference to FIGS. 6, 20, and 22 through 23B. As shown in FIG. 6, as with the first embodiment, in the third embodiment, the drive voltage Va outputted from the pulse generation source 22 has repeated steps each including a period in which a first voltage Va1 is outputted (preparatory period T1) and a period in which a second voltage Va2 is outputted (electron emission period T2).

Figure 22:
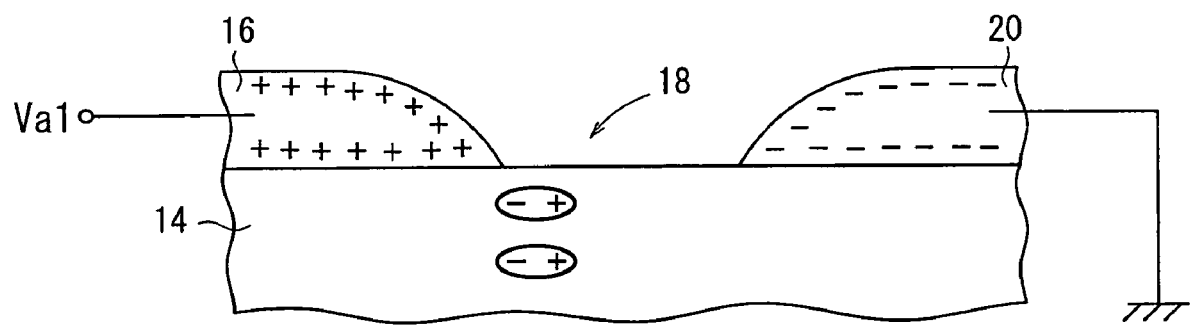
FIG. 22 is a view illustrative of operation when a first voltage is applied between the cathode electrode and the anode electrode.

The preparatory period T1 is a period in which the first voltage Va1 is applied between the cathode electrode 16 and the anode electrode 20 to polarize the emitter section 14 in one direction, as shown in FIG. 22. The first voltage Va1 may be a DC voltage, as shown in FIG. 6, but may be a single pulse voltage or a succession of pulse voltages. The preparatory period T1 should preferably be longer than the electron emission period T2 for sufficient polarization. For example, the preparatory period T1 should preferably be 100 μsec. or longer.

Figure 23A:
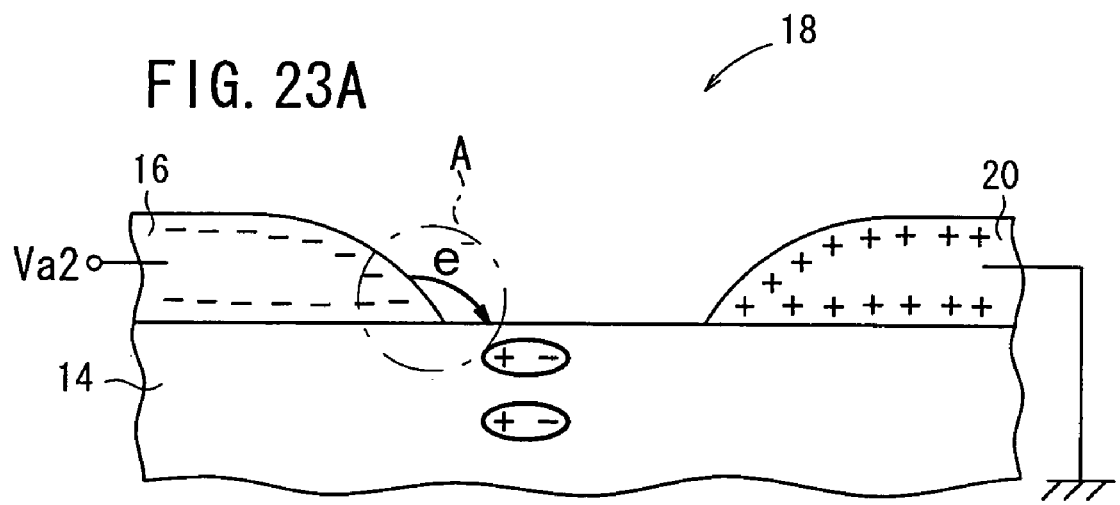
FIG. 23A is a view illustrative of operation (emission of primary electrons) when a second voltage is applied between the cathode electrode and the anode electrode.
Figure 23B:
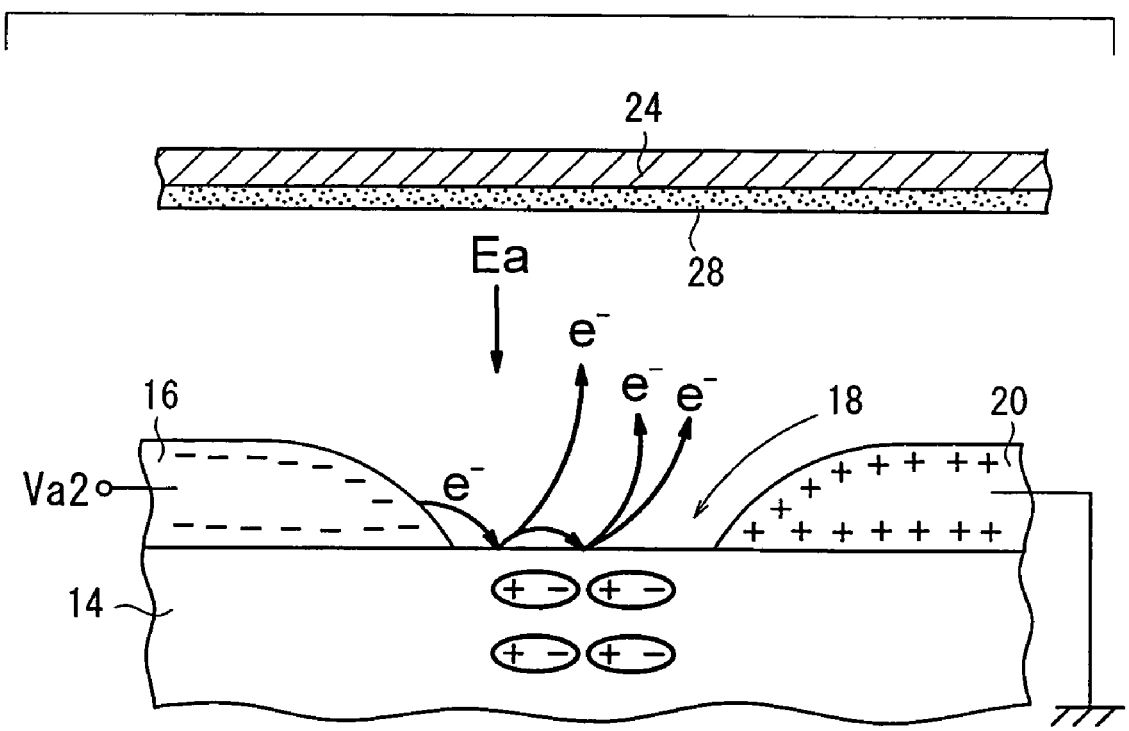
FIG. 23B is a view illustrative of operation of emission of secondary electrons caused by the emission of primary electrons.

The electron emission period T2 is a period in which the second voltage Va2 is applied between the cathode electrode 16 and the anode electrode 20. When the second voltage Va2 is applied between the cathode electrode 16 and the anode electrode 20, as shown in FIG. 23B, the polarization of at least a part of the emitter section 14 is reversed or changed. If the slit has a width d (see FIG. 20) and a voltage Vak is applied between the cathode electrode 16 and the anode electrode 20, then the polarization of the emitter section 14 is reversed or changed in an electric field E expressed by $E=Vak/d$, which is applied to the material of the emitter section 14.

Because of the reversed or changed polarization, a locally concentrated electric field is generated on the cathode electrode 16 and the positive poles of dipole moments in the vicinity thereof, emitting primary electrons from the cathode electrode 16. As shown in FIG. 23B, the primary electrons emitted from the cathode electrode 16 impinge upon the emitter section 14, causing the emitter section 14 to emit secondary electrons.

In the present embodiment, the triple point A is defined by the cathode electrode 16, the emitter section 14, and the vacuum. The primary electrons are emitted from the cathode electrode 16 near the triple point A, and the primary electrons thus emitted from the triple point A impinge upon the emitter section 14, causing the emitter section 14 to emit secondary electrons. If the thickness of the cathode electrode 16 is very small (up to 10 nm), then electrons are emitted from the interface between the cathode electrode 16 and the emitter section 14.

Since the electrons are emitted according to the principle as described above, the electron emission is stably performed, and the number of emitted electrons would reach 2 billion or more. Thus, the electronic pulse generation device is advantageously used in the practical applications. The number of emitted electrons is increased substantially proportional to the amplitude Vin of the drive voltage Va applied between the cathode electrode 16 and the anode electrode 20. Thus, the number of the emitted electrons can be controlled easily.

Of the emitted secondary electrons, some are emitted to the collector electrode 24 to excite the phosphor layer 28, which produces a fluorescent emission directed outwardly. Other secondary electrons and the primary electrons are emitted to the anode electrode 20.

In the electronic pulse generation device 10C according to the third embodiment, polarization of the emitter section 14 near the cathode electrode 16 is reversed or changed differently from the electronic pulse generation device 10A according to the first embodiment (including modifications) and the electronic pulse generation device 10B according to the second embodiment.

In the electronic pulse generation devices 10A, 10B according to the first and second embodiments, only the positive poles or the negative poles of the dipole moments are oriented to the cathode electrode 16. Therefore, the local electric field generated at the cathode electrode 16 is large. In contrast, in the electronic pulse generation device 10C according to the third embodiment, the electrodes are formed only on one principle surface of the emitter section 14.

In the second and third embodiments, when polarization of the emitter section 14 is reversed or changed, only the positive poles are oriented to the cathode electrode 16 having the negative polarity. Thus, the primary electrons are efficiently emitted from the cathode electrode 16.

In the electronic pulse generation devices 10A and 10B according to the first and second embodiments, one electronic pulse generation device 10A or 10B includes one emitter section 14, and one cathode electrode 16 and one anode electrode 20 formed on the emitter section 14. Alternatively, a plurality of electronic pulse generation devices 10(1), 10(2), 10(3) may be formed using one emitter section 14 as shown in FIG. 24, for example.

Figure 24:
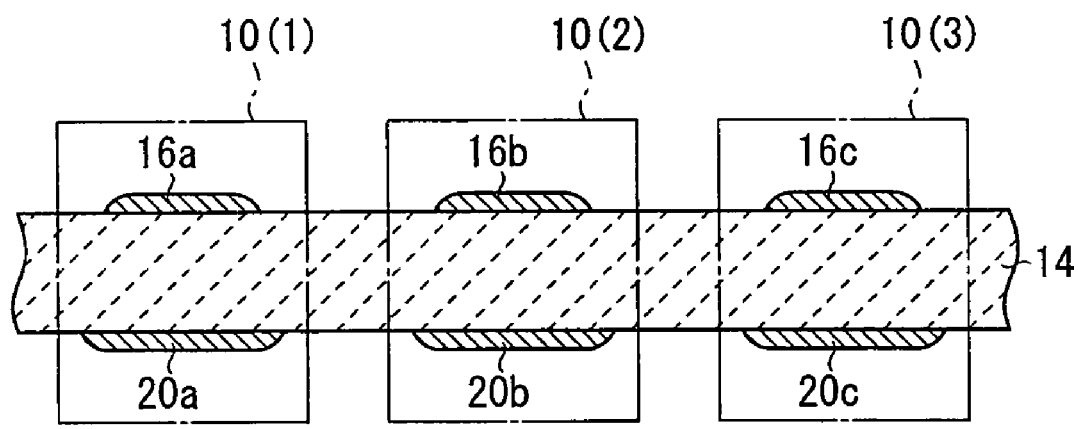
FIG. 24 is a view showing a first example in which a plurality of electronic pulse generation devices are combined.

Specifically, In the first example 100A shown in FIG. 24, a plurality of cathode electrodes 16a, 16b, 16c are formed independently on a front surface of one emitter section 14, and a plurality anode electrodes 20a, 20b, 20c are formed on a back surface of the emitter section 14 to form the plurality of electronic pulse generation devices 10(1), 10(2), 10(3). The anode electrodes 20a, 20b, 20c are provided under the corresponding cathode electrodes 16a, 16b, 16c. The emitter section 14 is interposed between the anode electrodes 20a, 20b, 20c and the cathode electrodes 16a, 16b, 16c.

Figure 25:
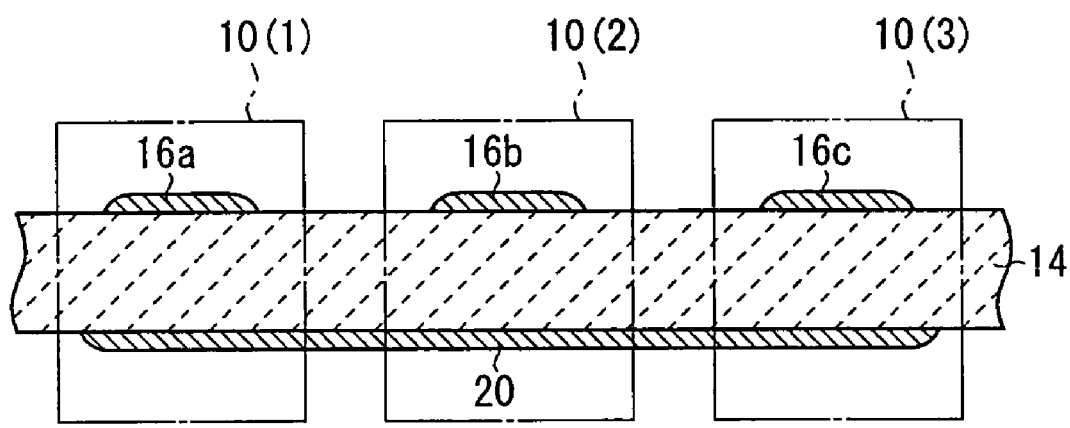
FIG. 25 is a view showing a second example in which a plurality of electronic pulse generation devices are combined.

In a second example 100B shown in FIG. 25, a plurality of cathode electrodes 16a, 16b, 16c are formed independently on a front surface of one emitter section 14, and one anode electrode 20 (common anode electrode) is formed on a back surface of the emitter section 14 to form a plurality of electronic pulse generation devices 10(1), 10(2), 10(3).

Figure 26:
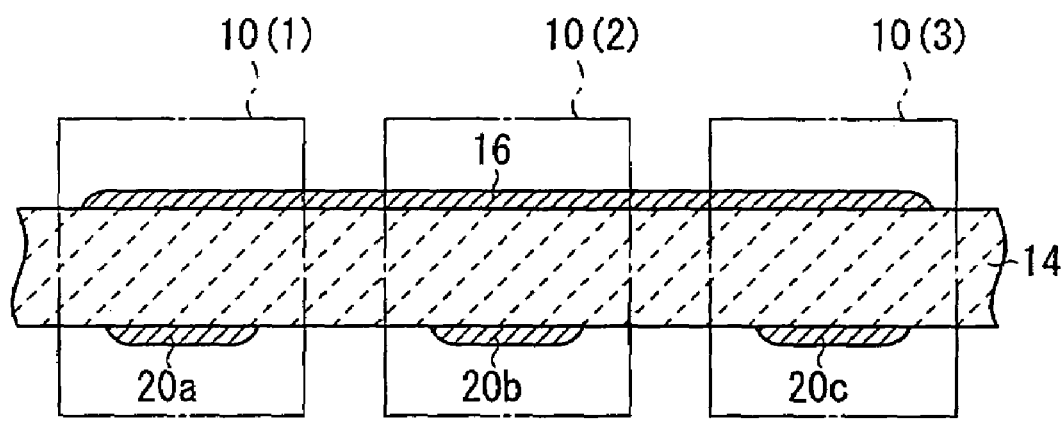
FIG. 26 is a view showing a third example in which a plurality of electronic pulse generation devices are combined.

In a third example 100C shown in FIG. 26, one very thin (up to 10 nm) cathode electrode 16 (common cathode electrode) is formed on a front surface of one emitter section 14, and a plurality of anode electrodes 20a, 20b, 20c are formed independently on a back surface of the emitter section 14 to form a plurality of electronic pulse generation devices 10(1), 10(2), 10(3).

Figure 27:
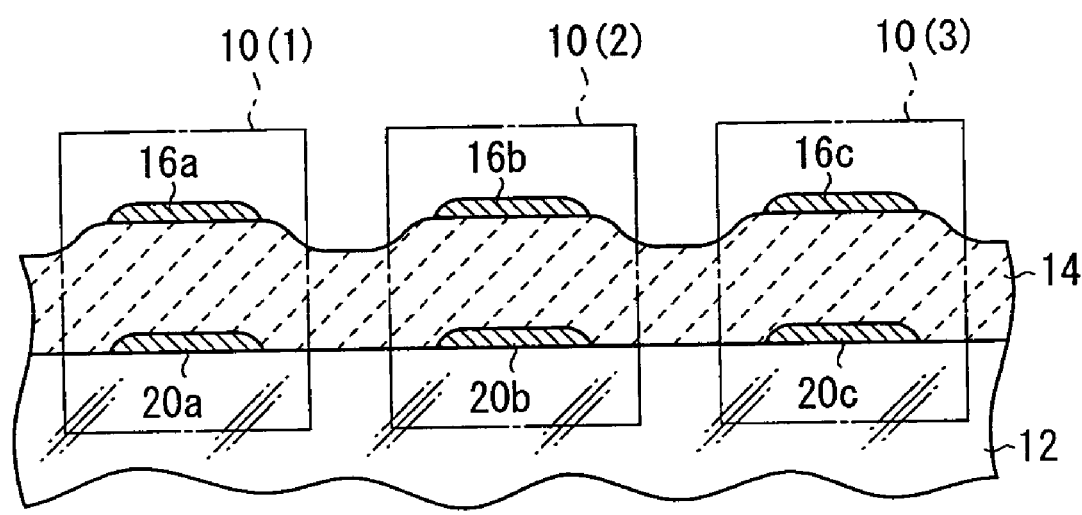
FIG. 27 is a view showing a fourth example in which a plurality of electronic pulse generation devices are combined.

In a fourth example 100D shown in FIG. 27, a plurality of anode electrodes 20a, 20b, 20c are formed independently on a substrate 12, one emitter section 14 is formed to cover these anode electrodes 20a, 20b, 20c, and a plurality of cathode electrodes 16a, 16b, 16c are formed independently on the emitter section 14 to form a plurality of electronic pulse generation device 10(1), 10(2), 10(3). The cathode electrodes 16a, 16b, 16c are provided above the corresponding anode electrodes 20a, 20b, 20c. The emitter section 14 is interposed between the anode electrodes 20a, 20b, 20c and the cathode electrodes 16a, 16b, 16c.

Figure 28:
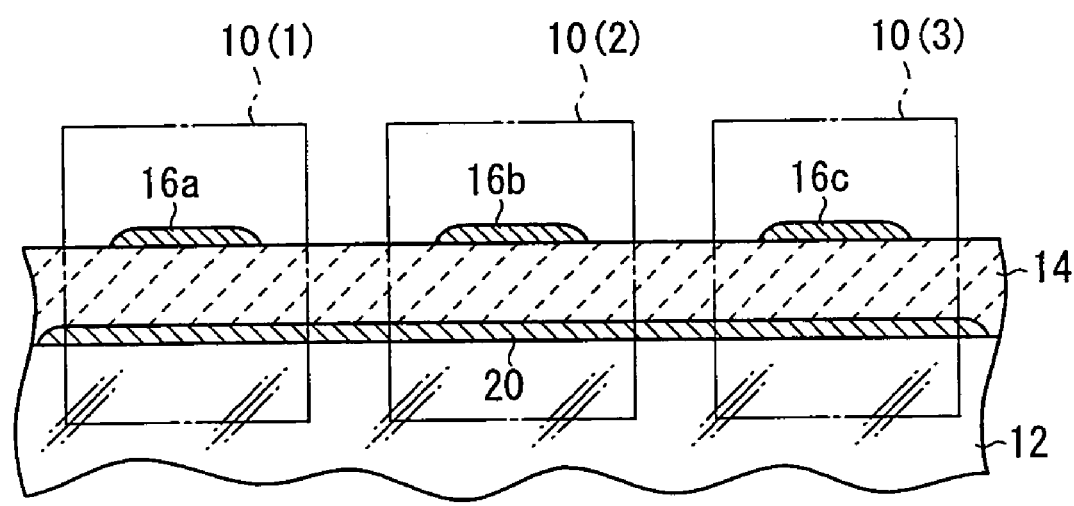
FIG. 28 is a view showing a fifth example in which a plurality of electronic pulse generation devices are combined.

In a fifth example 100E shown in FIG. 28, one anode electrode 20 is formed on a substrate 12, and one emitter section 14 is formed to cover the anode electrode 20, and a plurality of cathode electrodes 16a, 16b, 16c are formed independently on the emitter section 14 to form a plurality of electronic pulse generation devices 10(1), 10(2), 10(3).

Figure 29:
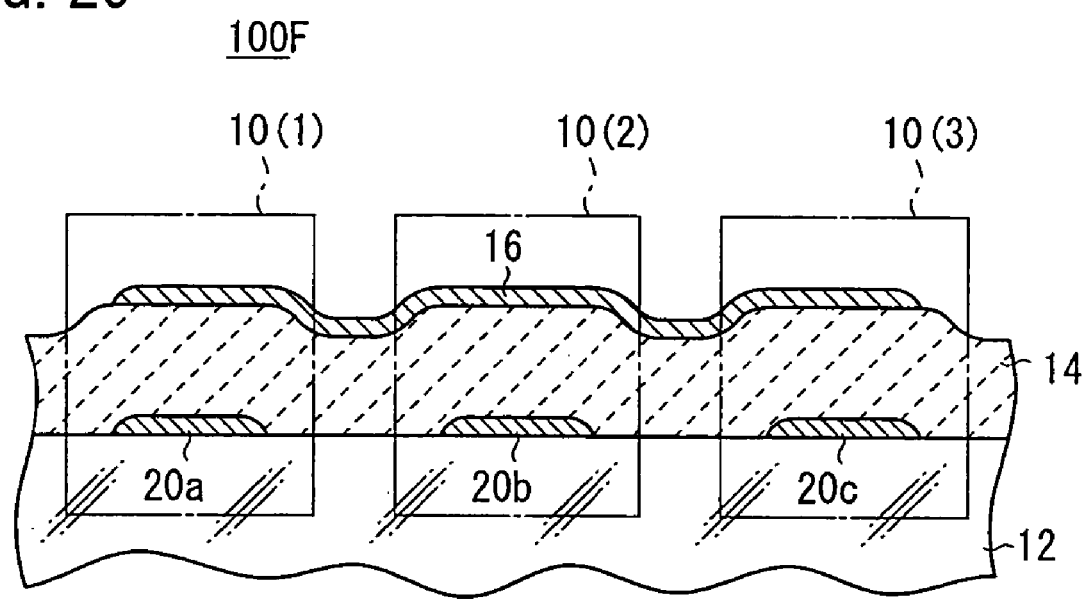
FIG. 29 is a view showing a sixth example in which a plurality of electronic pulse generation devices are combined.

In a sixth example 100F shown in FIG. 29, a plurality of anode electrodes 20a, 20b, 20c are formed independently on a substrate 12, one emitter section 14 is formed to cover these anode electrodes 20a, 20b, 20c, and one very thin cathode electrode 16 is formed on the emitter section 14 to form a plurality of electronic pulse generation devices 10(1), 10(2), 10(3).

In the first through six examples 100A through 100F, a plurality of electronic pulse generation devices 10(1), 10(2), 10(3) are formed using one emitter section 14. As described later, the electronic pulse generation devices 10(1), 10(2), 10(3) are suitably used as pixels of a display.

In the electronic pulse generation devices 10A through 10C according to the first through third embodiments, the collector electrode 24 is coated with a phosphor layer 28 to for use as a pixel of a display as shown in FIG. 1. The displays of the electronic pulse generation devices 10A through 10C offer the following advantages:

(1) The displays can be thinner (the panel thickness=several mm) than CRTs.

(2) Since the displays emit natural light from the phosphor layer 28, they can provide a wide angle of view which is about 180° unlike LCDs (liquid crystal displays) and LEDs (light-emitting diodes).

(3) Since the displays employ a surface electron source, they produce less image distortions than CRTs.

(4) The displays can respond more quickly than LCDs, and can display moving images free of after image with a high-speed response on the order of μsec.

(5) The displays consume an electric power of about 100 W in terms of a 40-inch size, and hence is characterized by lower power consumption than CRTs, PDPs (plasma displays), LCDs, and LEDs.

(6) The displays have a wider operating temperature range (−40 to +85° C.) than PDPs and LCDs. LCDs have lower response speeds at lower temperatures.

(7) The displays can produce higher luminance than conventional FED displays as the phosphor can be excited by a large current output.

(8) The displays can be driven at a lower voltage than conventional FED displays because the drive voltage can be controlled by the polarization reversing characteristics (or polarization changing characteristics) and film thickness of the piezoelectric material.

Because of the above various advantages, the displays can be used in a variety of applications described below.

(1) Since the displays can produce higher luminance and consume lower electric power, they are optimum for use as 30- through 60-inch displays for home use (television and home theaters) and public use (waiting rooms, karaoke rooms, etc.).

(2) Inasmuch as the displays can produce higher luminance, can provide large screen sizes, can display full-color images, and can display high-definition images, they are optimum for use as horizontally or vertically long, specially shaped displays, displays in exhibitions, and message boards for information guides.

(3) Because the displays can provide a wider angle of view due to higher luminance and fluorescent excitation, and can be operated in a wider operating temperature range due to vacuum modularization thereof, they are optimum for use as displays on vehicles. Displays for use on vehicles need to have a horizontally long 8-inch size whose horizontal and vertical lengths have a ratio of 15:9 (pixel pitch=0.14 mm), an operating temperature in the range from −30 to +85° C., and a luminance level ranging from 500 to 600 cd/m$^2$ in an oblique direction.

Because of the above various advantages, the electronic pulse generation devices can be used as a variety of light sources described below.

(1) Since the electronic pulse generation devices can produce higher luminance and consume lower electric power, they are optimum for use as projector light sources which are required to have a luminance level of 200 lumens.

(2) Because the electronic pulse generation devices can easily provide a high-luminance two-dimensional array light source, can be operated in a wide temperature range, and have their light emission efficiency unchanged in outdoor environments, they are promising as an alternative to LEDs. For example, the electronic pulse generation devices are optimum as an alternative to two-dimensional array LED modules for traffic signal devices. At 25° C. or higher, LEDs have an allowable current lowered and produce low luminance.

The electronic pulse generation device according to the present invention is not limited to the above embodiments, but may be embodied in various arrangement without departing from the scope of the present invention.

What is claimed is:

1. An electronic pulse generation device comprising:
    an emitter element made of a dielectric material;
    first and second electrodes formed in direct contact with said emitter element; and
    means for applying an alternating pulse between said first electrode and said second electrode to reverse or change polarization of said emitter element,
    wherein electrons are emitted intermittently from said emitter element.

2. An electronic pulse generation device according to claim 1, further comprising:
    a third electrode facing said emitter element;
    means for applying positive direct bias voltage to said third electrode; and
    a vacuum space present between said emitter element and said third electrode,
    wherein electrons are emitted intermittently from said emitter element toward said third electrode.

3. An electronic pulse generation device according to claim 1, wherein said emitter element comprises at least one of a piezoelectric material, an anti-ferroelectric material, and an electrostrictive material.

4. An electronic pulse generation device according to claim 1, wherein said first electrode is formed on a first surface of said emitter element, and said second electrode is formed on a second surface of said emitter element.

5. An electronic pulse generation device according to claim 1, wherein said alternating pulse is applied between said first electrode and said second electrode for causing said first electrode to have a potential lower than a potential of said second electrode to reverse or change polarization of at least a portion of said emitter element; and
    the polarization reversal or polarization change induces emission of electrons in the vicinity of said first electrode.

6. An electronic pulse generation device according to claim 1, wherein said alternating pulse is applied between said first electrode and said second electrode to reverse or change polarization of at least a portion of said emitter element;
    the polarization reversal or polarization change causes positive poles of dipole moments in the vicinity of said first electrode to be oriented toward said first electrode, inducing emission of primary electrons from said first electrode; and
    said emitted primary electrons impinge upon said emitter element to induce emission of secondary electrons from said emitter element.

7. An electronic pulse generation device comprising:
    an emitter element made of a dielectric material;
    first and second electrodes formed in contact with said emitter element;
    means for applying an alternating pulse between said first electrode and said second electrode to reverse or change polarization of said emitter element;
    wherein said means for applying alternating pulse applies a first voltage between said first electrode and said second electrode for causing said first electrode to have a potential higher than a potential of said second electrode in a first period to perform said polarization of said emitter element in one direction,
    wherein said means for applying alternating pulse applies a second voltage between said first electrode and said second electrode for causing said first electrode to have a potential lower than a potential of said second electrode in a second period to perform said polarization reversal or polarization change of said emitter element for emitting electrons, and
    wherein electrons are emitted intermittently from said emitter element.

8. An electronic pulse generation device comprising:
    an emitter element made of a dielectric material;
    first and second electrodes disposed in contact with a principal surface of said emitter element, with a slit defined between said first electrode and said second electrode, said emitter element being partly exposed through said slit; and
    means for applying an alternating pulse between said first electrode and said second electrode to reverse or change polarization of said emitter element,
    wherein electrons are emitted intermittently from said emitter element.

9. An electronic pulse generation device comprising:
    an emitter element made of a dielectric material;

a first electrode formed on a first surface of said emitter element;

a second electrode formed on a second surface of said emitter element; and means for applying an alternating pulse between said first electrode and said second electrode to reverse or change polarization of said emitter element, wherein polarization reversal or polarization change occurs in an electric field E applied to said emitter element represented by E=Vak/h, where h is a thickness of said emitter element between said first electrode and said second electrode, and Vak is a voltage between said first electrode and said second electrode, and wherein electrons are emitted intermittently from said emitter element.

10. An electronic pulse generation device comprising:

an emitter element made of a dielectric material;

first and second electrodes formed in contact with said emitter element; and means for applying an alternating pulse between said first electrode and said second electrode to reverse or change polarization of at least a portion of said emitter element, wherein said first electrode, said emitter element and a vacuum atmosphere define a triple point, wherein the polarization reversal or polarization change causes positive poles of dipole moments in the vicinity of said first electrode to be oriented toward said first electrode, thereby inducing emission of primary electrons from a portion of said first electrode in the vicinity of said triple point, and wherein said emitted primary electrons impinge upon said emitter element to induce emission of secondary electrons from said emitter element.

* * * * *